US012695181B2

(12) United States Patent
Yu et al.

(10) Patent No.: US 12,695,181 B2
(45) Date of Patent: Jul. 28, 2026

(54) ELECTRONIC DEVICE

(71) Applicant: Advanced Semiconductor Engineering, Inc., Kaohsiung (TW)

(72) Inventors: Chung Ju Yu, Kaohsiung (TW); Yuanhao Yu, Kaohsiung (TW); Weifan Wu, Kaohsiung (TW); Yong-Chang Syu, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 120 days.

(21) Appl. No.: 18/624,071

(22) Filed: Apr. 1, 2024

(65) Prior Publication Data

US 2025/0309529 A1 Oct. 2, 2025

(51) Int. Cl.
*H01Q 1/50* (2006.01)
*H01Q 1/22* (2006.01)

(52) U.S. Cl.
CPC ................. *H01Q 1/50* (2013.01); *H01Q 1/22* (2013.01)

(58) Field of Classification Search
CPC .................................. H01Q 1/50; H01Q 1/22
See application file for complete search history.

(56) References Cited

U.S. PATENT DOCUMENTS 6,903,687 B1 * 6/2005 Fink ..................... H01Q 9/0407 333/126
9,007,273 B2 * 4/2015 Liao ........................ H01L 25/16 343/841
9,196,958 B2 11/2015 Arnold et al.
9,653,415 B2 5/2017 Lee et al.
10,530,038 B2 * 1/2020 Hsu ...................... H01Q 21/062
11,037,891 B2 * 6/2021 Lin ..................... H01L 21/4857
11,362,036 B2 6/2022 Liu
2017/0181287 A1 * 6/2017 Jhang ................... H01Q 9/0407
2023/0154825 A1 5/2023 Tong
2023/0216174 A1 7/2023 Yu et al.
2025/0046981 A1 * 2/2025 Yu ...................... H01Q 21/0006

OTHER PUBLICATIONS

U.S. Appl. No. 18/228,616, filed Jul. 31, 2023, Yu et al.

* cited by examiner

*Primary Examiner* — Hai V Tran
(74) *Attorney, Agent, or Firm* — Foley & Lardner LLP

(57) ABSTRACT

The present disclosure provides an electronic device. The electronic device includes a carrier and an antenna unit. The antenna unit includes a base portion and an extension portion protruding downwardly from the base portion. The carrier supports the extension portion and is configured to reduce a frequency offset of signals from the antenna unit.

11 Claims, 27 Drawing Sheets

ELECTRONIC DEVICE

BACKGROUND

1. Technical Field

The present disclosure relates to an electronic device.

2. Description of the Related Art

Electronic device(s) using antennas for signal transmission (e.g., radio frequency (RF) signal) may include an antenna layer and a circuit layer electrically connected thereto. Typically, coupling member(s) may be coupled to the feeding point and/or the grounding point of the antenna layer. However, the installation space required for these coupling members could be a bottleneck for package minimization and production efficiency. In addition, the signal transmission through a coupling member has the potential to be unstable, inadvertently affecting the antenna performance.

SUMMARY

In some arrangements, an electronic device includes a carrier and an antenna unit. The antenna unit includes a base portion and an extension portion protruding downwardly from the base portion. The carrier supports the extension portion and is configured to reduce a frequency offset of signals from the antenna unit.

In some arrangements, an electronic device includes a carrier, an antenna unit, and a conductive element. The antenna unit is disposed over the carrier. The antenna unit includes a conductive structure defining an opening extending toward the carrier. The conductive element is disposed within the opening and configured to transceive a radio frequency (RF) signal between the carrier and the conductive structure.

In some arrangements, an electronic device includes a carrier and an antenna unit. The antenna unit includes an antenna pattern and a feeding element connected to the antenna pattern. The feeding element has a first end recessed from the antenna pattern and a second end protruding downwardly from the antenna pattern. The second end is electrically connected to the carrier.

BRIEF DESCRIPTION OF THE DRAWINGS

Aspects of some arrangements of the present disclosure are best understood from the following detailed description when read with the accompanying figures. It should be noted that various structures may not be drawn to scale, and dimensions of the various structures may be arbitrarily increased or reduced for clarity of discussion.

DETAILED DESCRIPTION

Figure 1A:
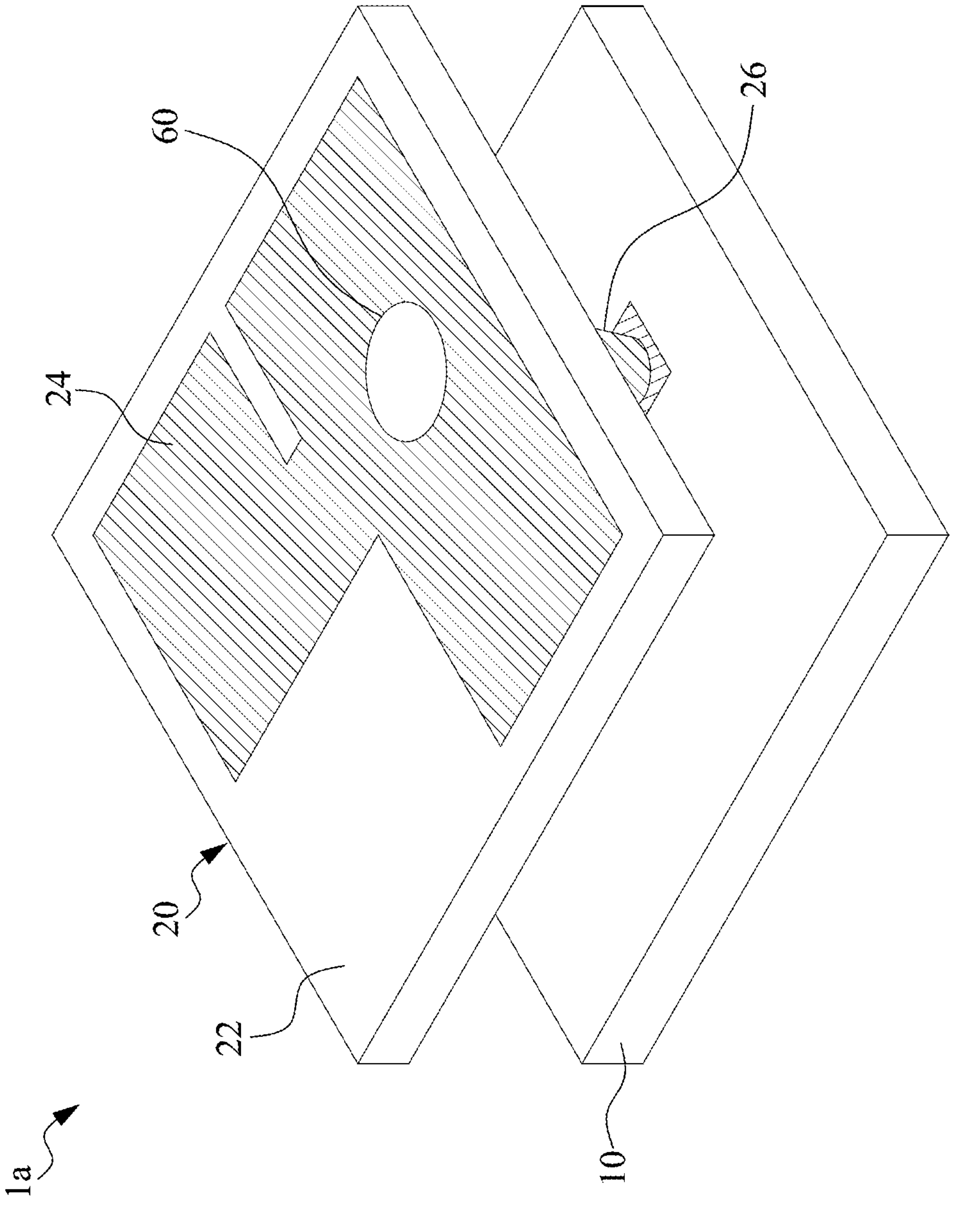
FIG. 1A illustrates a perspective view of an electronic device in accordance with some arrangements of the present disclosure.

The following disclosure provides many different arrangements, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include arrangements in which the first and second features are formed or disposed in direct contact, and may also include arrangements in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various arrangements and/or configurations discussed.

Spatial descriptions, such as “above,” “below,” “up,” “left,” “right,” “down,” “top,” “bottom,” “vertical,” “horizontal,” “side,” “higher,” “lower,” “upper,” “over,” “under,” and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of arrangements of this disclosure are not deviated from by such arrangement.

Figure 1B:
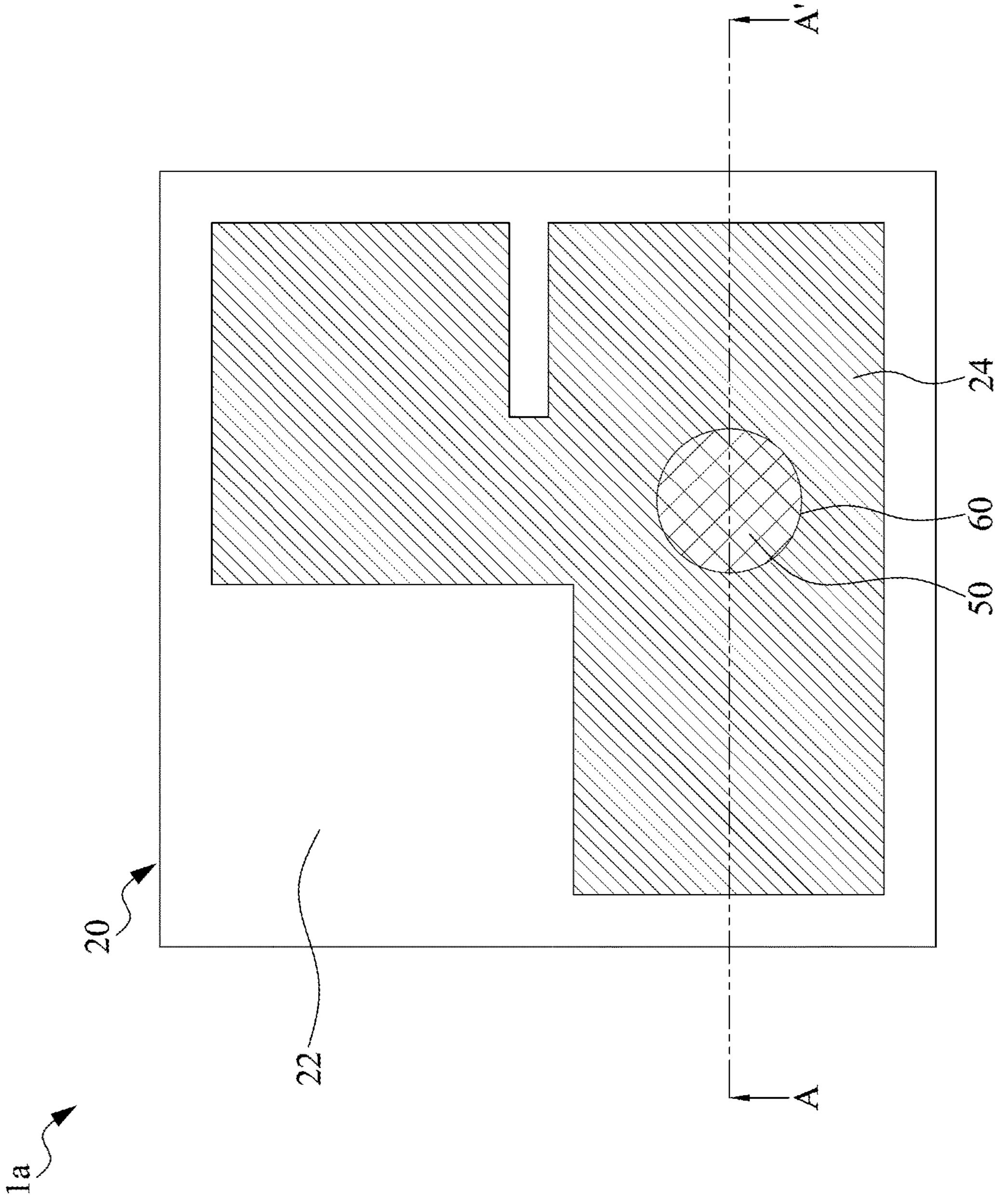
FIG. 1B illustrates a top view of the electronic device as shown in FIG. 1A in accordance with some arrangements of the present disclosure.
Figure 1C:
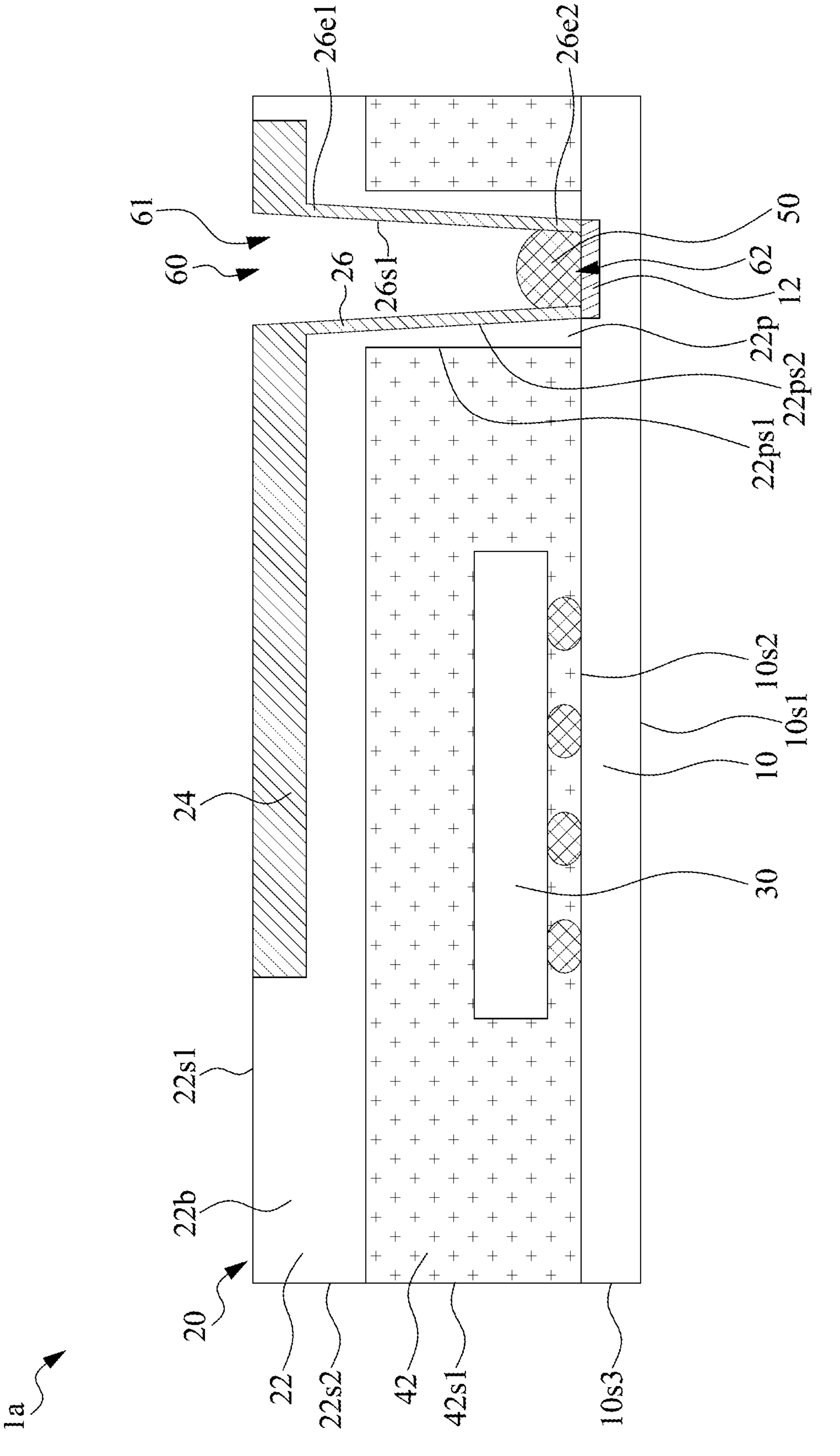
FIG. 1C illustrates a cross-sectional view along line A-A' of the electronic device as shown in FIG. 1B in accordance with some arrangements of the present disclosure.

FIG. 1A, FIG. 1B, and FIG. 1C illustrate an electronic device 1*a* in accordance with some arrangements of the present disclosure. It should be noted than some features are omitted from FIG. 1A and FIG. 1B for brevity.

In some arrangements, as shown in FIG. 1C, the electronic device 1a may include a carrier 10, an antenna unit 20, at least one electronic component 30, an encapsulant 42, and an electrical connector 50.

The carrier 10 may include a system board, a main board, or a printed circuit board (PCB). The carrier 10 may include a circuit structure or an interconnection structure, such as a redistribution layer (RDL), a circuit layer, a conductive trace, a conductive pad, a conductive via, etc. The carrier 10 may include a surface 10s1 (or a lower surface), a surface 10s2 (or an upper surface) opposite to the surface 10s1, and a surface 10s3 (or a lateral surface) extending between the surface 10s1 and surface 10s2. The carrier 10 may include a conductive pad 12 exposed by the surface 10s2. The conductive pad 12 may be configured to, for example, provide the antenna unit 20 with a feeding signal.

The antenna unit 20 may be disposed on or over the surface 10s2 of the carrier 10. The antenna unit 20 may be configured to radiate and/or receive electromagnetic (EM) signals, such as RF signals. In some arrangements, the antenna unit 20 may include an antenna in package (AiP) device. The antenna unit 20 may be of any suitable type, such as patch antennas, slot-coupled antennas, stacked patches, dipoles, monopoles, etc., and may have different orientations and/or polarizations. The antenna unit 20 may include an ultra-wideband antenna. In simulated results of S-parameter (dB) versus frequency of the antenna unit 20, the range/band of frequencies less than 10% of the fed signal (i.e., −10 dB) is between approximately 7.62 GHz and 8.38 GHz. In some arrangements, the antenna unit 20 may be pre-formed by a laser direct structuring (LDS) process.

In some arrangements, the antenna unit 20 may include a dielectric structure 22, an antenna pattern 24, and a feeding portion 26 (or conductive structure or feeding element). The dielectric structure 22 may be configured to support the antenna pattern 24 and/or feeding portion 26. The dielectric structure 22 may be disposed on and/or attached to the surface 10s2 of the carrier 10. In some arrangements, the dielectric structure 22 may include a compound, such as a liquid crystal compound. For example, the dielectric structure 22 may include a compound having a liquid crystal base, such as a liquid crystal polymer (LCP). The dielectric structure 22 may withstand temperatures up to 260 degrees Celsius or higher. The dielectric structure 22 may have a dielectric constant (Dk) between about 2 and 6. The dielectric structure 22 may have a dissipation factor (Df) between about 0 and 0.009. In some arrangements, the dielectric structure 22 may include an epoxy resin, a thermoplastic polyurethane (TPU), soda-lime-silica glass, alkali-aluminosilicate glass, liquid silicone rubber (LSR), polycarbonate (PC), nylon, polybutylene terephthalate (PBT), etc. The dielectric structure 22 may have a surface 22s1 (or an upper surface) and a surface 22s2 (or a lateral surface) substantially perpendicular to the surface 22s1.

In some arrangements, the dielectric structure 22 may have a base 22b (or a base portion) and an extension 22p (or extension portion) connected to the base 22b. The base 22b may be a plate spaced apart from the carrier 10. The base 22b may support the antenna pattern 24. The extension 22p may extend between the base 22b and the carrier 10. The extension 22p may support the base 22b. The extension 22p may have a surface 22ps1 (or an outer sidewall) and a surface 22ps2 (or an inner sidewall). In some arrangements, the surface 22ps2 may define an opening 60 (or recess or through hole) extending between the surface 10s2 of the carrier 10 and the surface 22s1 of the dielectric structure 22. In some arrangements, the slope defined by the surface 22ps1 and the surface 10s2 may be different from the slope defined by the surface 22ps2 and the surface 10s2. In some arrangements, the surface 22ps1 may be steeper than surface 22ps2 with respect to the surface 10s2 of the carrier 10. In some arrangements, the extension 22p may be tapered along a direction far away from the carrier 10.

The antenna pattern 24 may be adjacent to the surface 22s1 of the dielectric structure 22. The antenna pattern 24 may be exposed by the surface 22s1 of the dielectric structure 22. Although FIG. 1C illustrates that the antenna pattern 24 is embedded within the dielectric structure 22, it should be noted that the antenna pattern 24 may protrude from the surface 22s1 in other arrangements. The antenna pattern 24 may be configured to receive and/or transmit an RF signal from and/or toward the environment. Further, the profile of the antenna pattern 24 as shown in FIG. 1A and FIG. 1B is merely exemplary; the antenna pattern 24 may include other shapes, such as a circle, an oval, a triangle, a quadrangle, a polygon, or a combination thereof.

The feeding portion 26 (or a conductive structure) may extend between the antenna pattern 24 and the surface 10s2 of the carrier 10. The feeding portion 26 may be configured to receive and/or transmit a feeding signal(s). In some arrangements, the feeding portion 26 may protrude toward the carrier 10. In some arrangements, the feeding portion 26 may be electrically connected to the antenna pattern 24. In some arrangements, the feeding portion 26 may be electrically connected to the conductive pad 12 of the carrier 10. In some arrangements, the bottom (or lower surface) of the feeding portion 26 may be at a level (or elevation) substantially the same as that of the surface 10s2 with respect to the surface 10s1 of the carrier 10. In some arrangements, the bottom (or lower surface) of the feeding portion 26 may be slightly elevated (e.g., 5 μm or less) compared to the surface 10s2 of the carrier 10. In some arrangements, the feeding portion 26 may include a metallic material, such as copper (Cu), titanium (Ti), gold (Au), silver (Ag), an alloy, or a combination thereof.

In some arrangements, the feeding portion 26 may be disposed on the surface 22ps2 of the extension 22p. In some arrangements, the feeding portion 26 may be conformally disposed on the surface 22ps2 of the extension 22p. The feeding portion 26 may include a surface 26s1 (or an inner wall) defining the opening 60. As shown in FIG. 1A, the aperture defined by the surface 26s1 (e.g., the opening 60) may be tapered toward the carrier 10. For example, the feeding portion 26 may have a first end 26e1 adjacent to the antenna pattern 24 and a second end 26e2 adjacent to the carrier 10. The opening 60 may define a first aperture (or first opening) at the first end 26e1 and a second aperture (or second opening) at the second end 26e2. The width (or diameter) of the first aperture is greater than that of the second aperture.

The electronic component 30 may be disposed on or over the surface 10s2 of the carrier 10. In some arrangements, the electronic component 30 may be configured to control the antenna elements. For example, the electronic component 30 may be configured to control the feeding start and end times, the feeding duration, the number of feed points, the location of feed points, the RF impedance matching, the transmitting start and end times, the receiving start and end times, the grounding start and end times, the grounding duration, the number of ground points, the location of ground points, the frequencies (or operating frequencies), the bandwidths (or operating bandwidths), the wavelengths of the EM waves, etc.

The electronic component 30 may be a chip or a die including a semiconductor substrate, one or more integrated circuit devices and one or more overlying interconnection structures therein. The integrated circuit devices may include active devices such as transistors and/or passive devices such as resistors, capacitors, inductors, or a combination thereof. In some arrangements, the electronic component 30 may include a transmitter, a receiver, or a transceiver. In some arrangements, the electronic component 30 may include a processing unit and/or a controller. In some arrangements, the electronic component 30 may include a radio frequency IC (RFIC), an analog-to-digital (A/D) converter, a digital-to-analog (D/A) converter, a filter, a low noise amplifier (LNA), a power amplifier, a multiplexer, a demultiplexer, a modulator, and/or a demodulator, etc. Although FIG. 1C illustrates that the electronic device 1*a* includes one electronic component 30, it should be noted that the electronic device 1*a* may include more electronic components based on the requirements. Further, the electronic component 30 may be electrically connected to the carrier 10 by electrical connectors (e.g., solder material) or other suitable elements, such as conductive wires.

In some arrangements, the encapsulant 42 may be disposed on or over the surface 10*s*2 of the carrier 10. In some arrangements, the encapsulant 42 may be disposed between the carrier 10 and the dielectric structure 22. The encapsulant 42 may encapsulate the electronic component 30. In some arrangements, the encapsulant 42 may encapsulate and/or surround the extension 22*p* of the dielectric structure 22. In some arrangements, the encapsulant 42 may encapsulate and/or surround the feeding portion 26. The encapsulant 42 may be in contact with the surface 22*ps*1. The feeding portion 26 may be spaced apart from the encapsulant 42. In some arrangements, the encapsulant 42 may be made of molding material that may include, for example, a novolac-based resin, an epoxy-based resin, a silicone-based resin, or another suitable encapsulant. Suitable fillers may also be included, such as powdered SiO2. The encapsulant 42 may include a molding compound, which is formed by a molding technique, such as compression molding, injection molding, or transfer molding. The encapsulant 42 may have a surface 42*s*1 (or a lateral surface) exposed by the carrier 10 and the dielectric structure 22. In some arrangements, the surface 42*s*1 of the encapsulant 42 may be substantially aligned with the surface 10*s*3 of the carrier 10. In some arrangements, the surface 42*s*1 of the encapsulant 42 may be substantially aligned with the surface 22*s*2 of the dielectric structure 22. In some arrangements, the bottom (or a lower surface) of the encapsulant 42 may be at a level (or elevation) substantially the same as that of the surface 10*s*2 with respect to the surface 10*s*1 of the carrier 10. In some arrangements, the encapsulant 42 may have a vertical length less than that of the feeding portion 26.

In some arrangements, the electrical connector 50 (or a bonding element or a conductive element) may be disposed on or over the surface 10*s*2 of the carrier 10. The electrical connector 50 may be electrically connected to the carrier 10 through the conductive pad 12. The electrical connector 50 may be configured to transceive an RF signal between the carrier 10 and the feeding portion 26. In some arrangements, the electrical connector 50 may be disposed within the opening 60. In some arrangements, the electrical connector 50 may be exposed by the opening 60. In some arrangements, the electrical connector 50 may be electrically connected to the feeding portion 26. In some arrangements, a feeding signal may be transmitted from the carrier 10 to the feeding portion 26 through the electrical connector 50. In some arrangements, the electrical connector 50 may be surrounded by the feeding portion 26. In some arrangements, the bottom (or a lower surface) of the electrical connector 50 may be at a level (or elevation) substantially the same as that of the surface 10*s*2 with respect to the surface 10*s*1 of the carrier 10. The electrical connector 50 may include a metallic material different from that of the feeding portion 26. In some arrangements, the electrical connector 50 may include a reflowable material or a solder material, such as tin (Sn), gallium (Ga), indium (In), bismuth (Bi), or other suitable materials. The reflowable temperature of the electrical connector 50 may be about 260 degrees Celsius or higher.

In a comparative example, an antenna pattern is connected to a conductive structure, such as a copper pillar, and may experience rotation or shifting during a reflow technique. This may cause a frequency offset between electronic devices. In some arrangements, the antenna pattern 24 and feeding portion 26 may be formed and integrated with the dielectric structure 22 before being attached to the carrier 10. Additionally, multiple antenna units 20 can be integrated and attached to the carrier 10 in a single step. This allows for more accurate alignment of the feeding portion 26 and/or opening 60 with the electrical connector 50 or conductive pad 12, reducing errors. As a result, the antenna patterns 24 of different electronic devices may have a relatively small offset, such as a displacement offset, rotation offset, or other offsets. Consequently, the feeding portion 26 can be configured to minimize the frequency offset of signals (e.g., RF signals) between different antenna units 20.

Figure 2A:
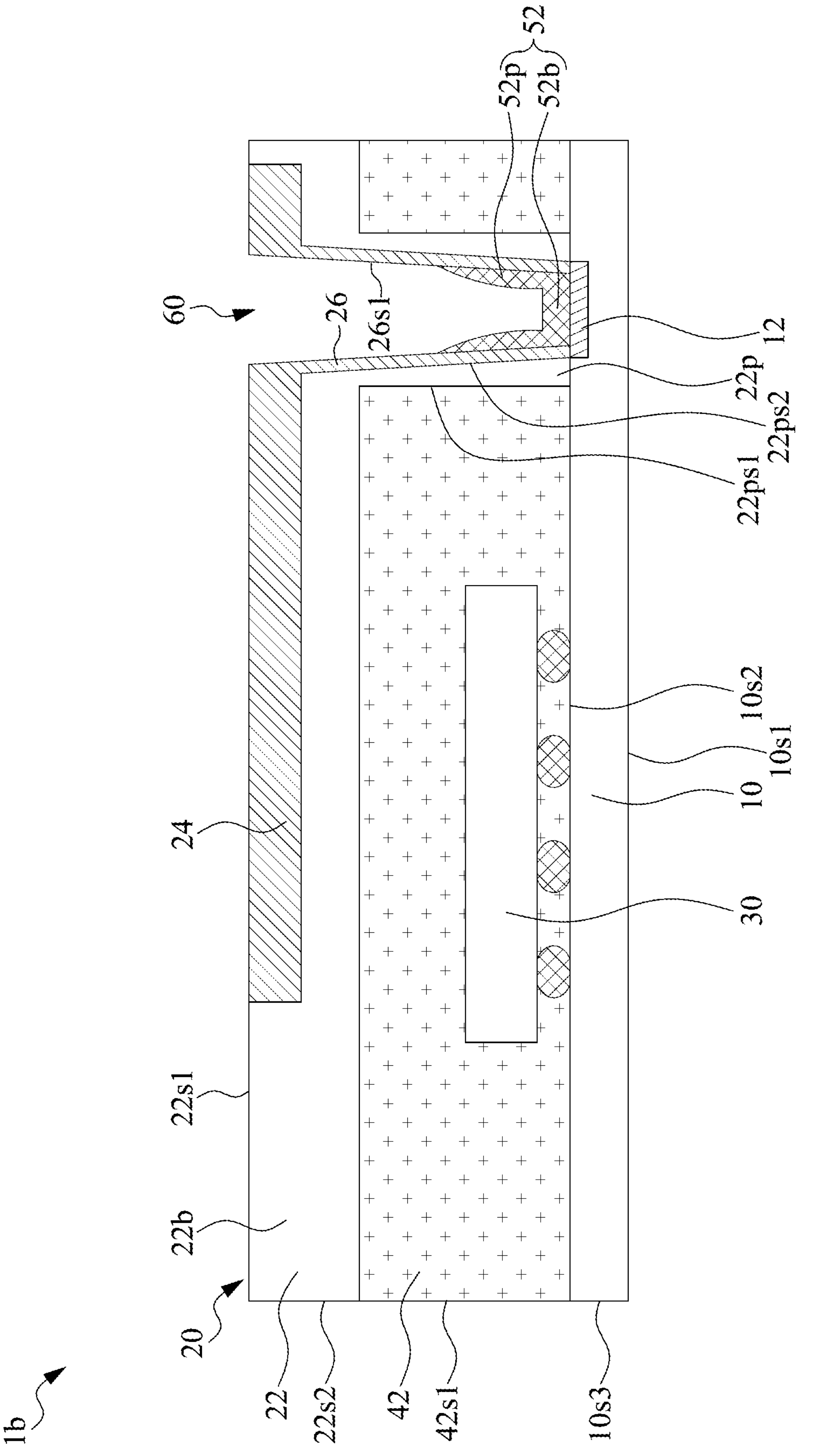
FIG. 2A illustrates a cross-sectional view of an electronic device in accordance with some arrangements of the present disclosure.

FIG. 2A illustrates a cross-sectional view of an electronic device 1*b* in accordance with some arrangements of the present disclosure. The electronic device 1*b* of FIG. 2A is similar to the electronic device 1*a* in FIG. 1C, differing as follows.

In some arrangements, the electronic device 1*b* may include an electrical connector 52 (or a bonding material). The material of the electrical connector 52 may be the same as or similar to that of the electrical connector 50. In some arrangements, the electrical connector 52 may climb onto the surface 26*s*1. In some arrangements, the electrical connector 52 may include a base 52*b* and a protruded portion 52*p*. The base 52*b* may be disposed on or over the conductive pad 12. The protruded portion 52*p* may protrude from the base 52*b* and toward the antenna pattern 24. The protruded portion 52*p* may be disposed on the surface 26*s*1 of the feeding portion 26. In some arrangements, when the reflowable temperature (may be about 260 degrees Celsius or higher) of the electrical connector 52 is reached, the electrical connector 52 can be softened, liquefied, or become flowable and may climb/flow onto the surface 26*s*1 of the feeding portion 26. In some arrangements, the protruded portion 52*p* may define a recess exposing the base 52*b*. A portion of the surface 26*s*1 may be exposed by the electrical connector 52.

Figure 2B:
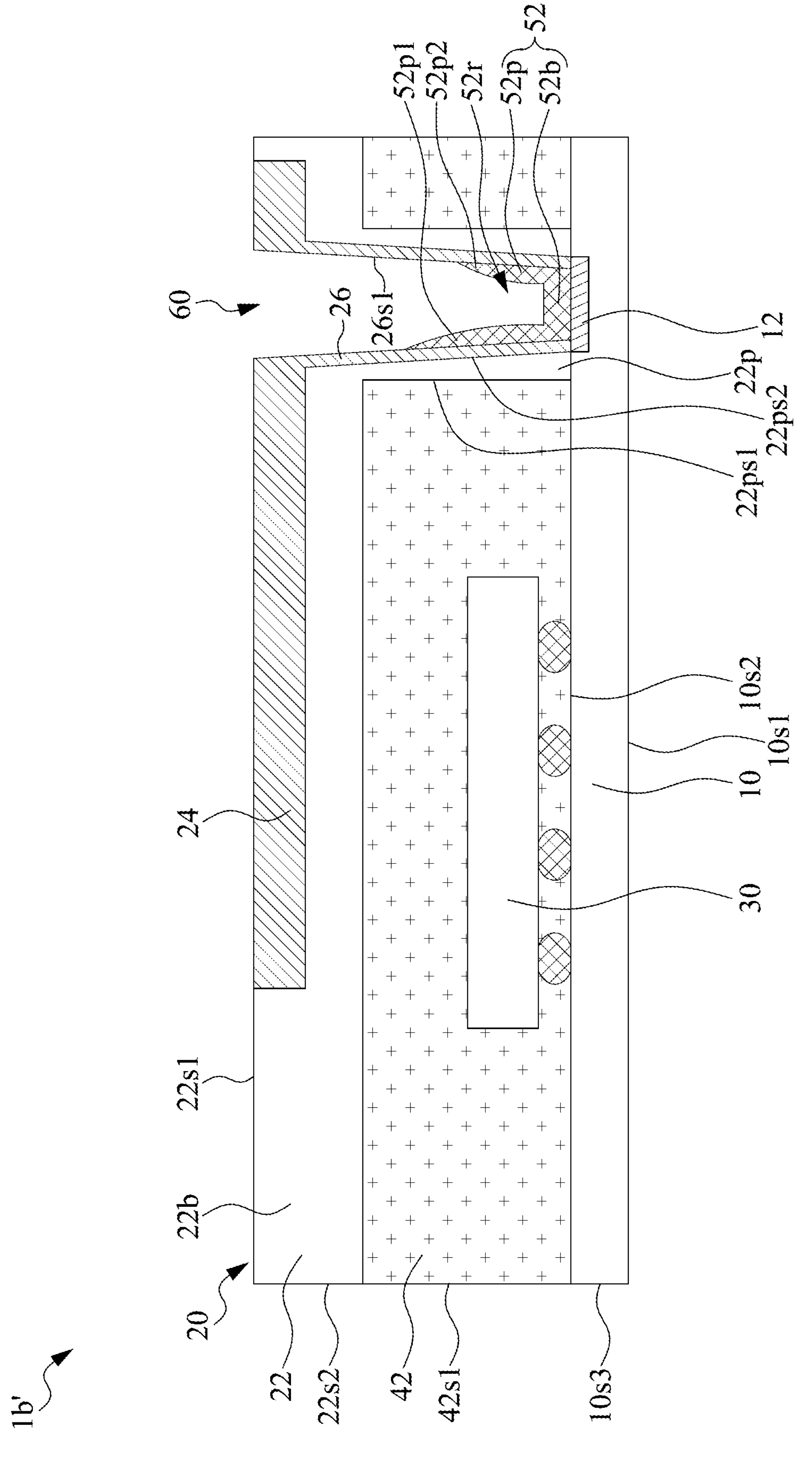
FIG. 2B illustrates a cross-sectional view of an electronic device in accordance with some arrangements of the present disclosure.

FIG. 2B illustrates a cross-sectional view of an electronic device 1*b*' in accordance with some arrangements of the present disclosure. The electronic device 1*b*' of FIG. 2B is similar to the electronic device 1*b* in FIG. 2A, differing as follows.

In some arrangements, the protruded portion 52*p* may include parts 52*p*1 and 52*p*2 (or portions). The electrical connector 52 may define a recess 52*r*. The part 52*p*1 may be spaced apart from the part 52*p*2 by the recess 52*r* in a cross-sectional view. In some arrangements, the parts 52*p*1 and 52*p*2 may extend into different elevations with respect to the carrier 10.

Figure 3:
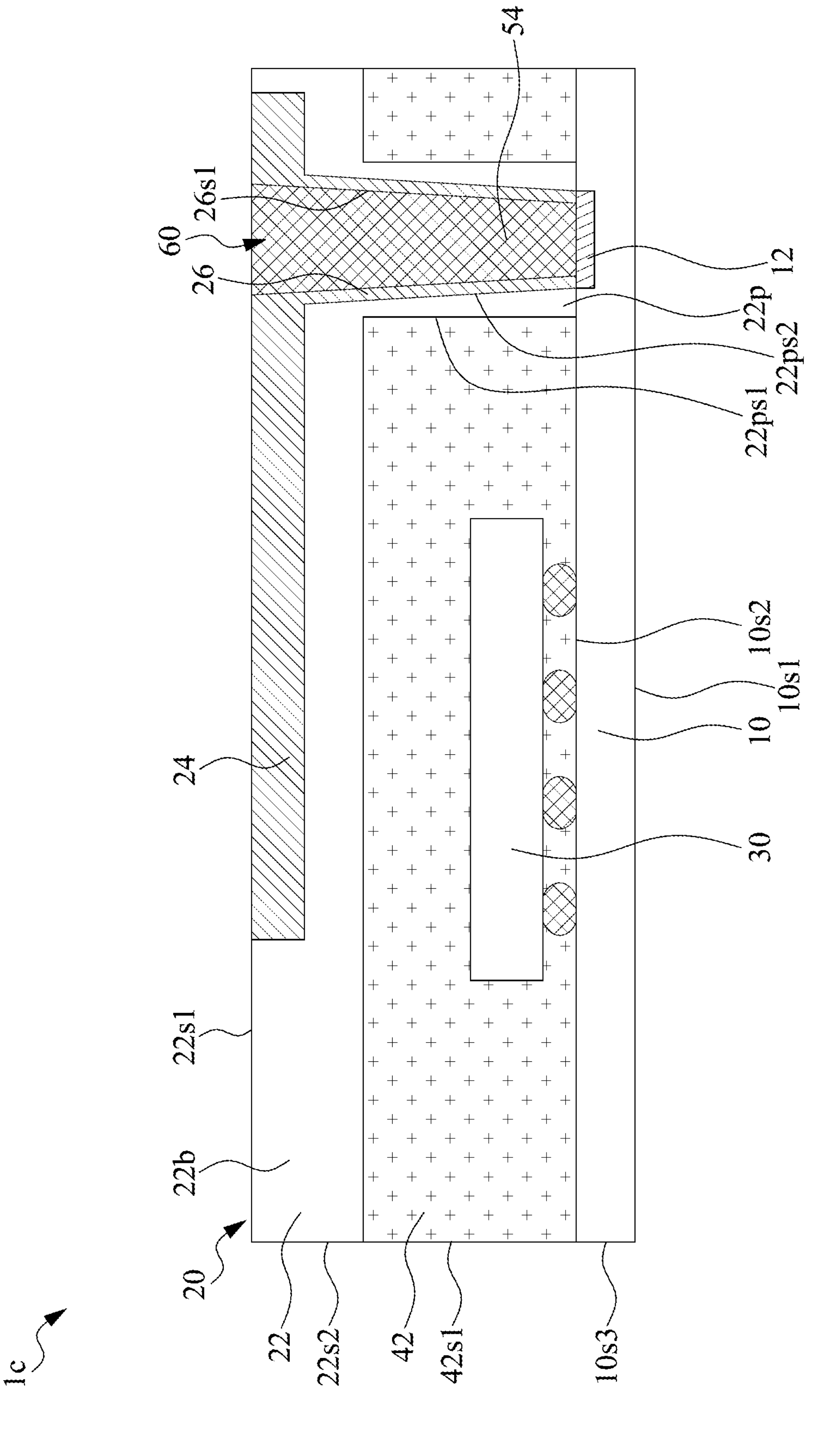
FIG. 3 illustrates a cross-sectional view of an electronic device in accordance with some arrangements of the present disclosure.

FIG. 3 illustrates a cross-sectional view of an electronic device 1*c* in accordance with some arrangements of the present disclosure. The electronic device 1*c* of FIG. 3 is similar to the electronic device 1*a* in FIG. 1C, differing as follows.

In some arrangements, the electronic device 1*c* may include an electrical connector 54 (or a bonding material). The material of the electrical connector 54 may be the same as or similar to that of the electrical connector 50. In some arrangements, the electrical connector 54 may fill the opening 60. In some arrangements, the surface 26*s*1 of the feeding portion 26 may be completely covered by the electrical connector 54. In this arrangement, the top (or upper surface) of the electrical connector 54 may be at a level substantially the same as or higher than that of the surface 22*s*1 of the dielectric structure 22.

Figure 4:
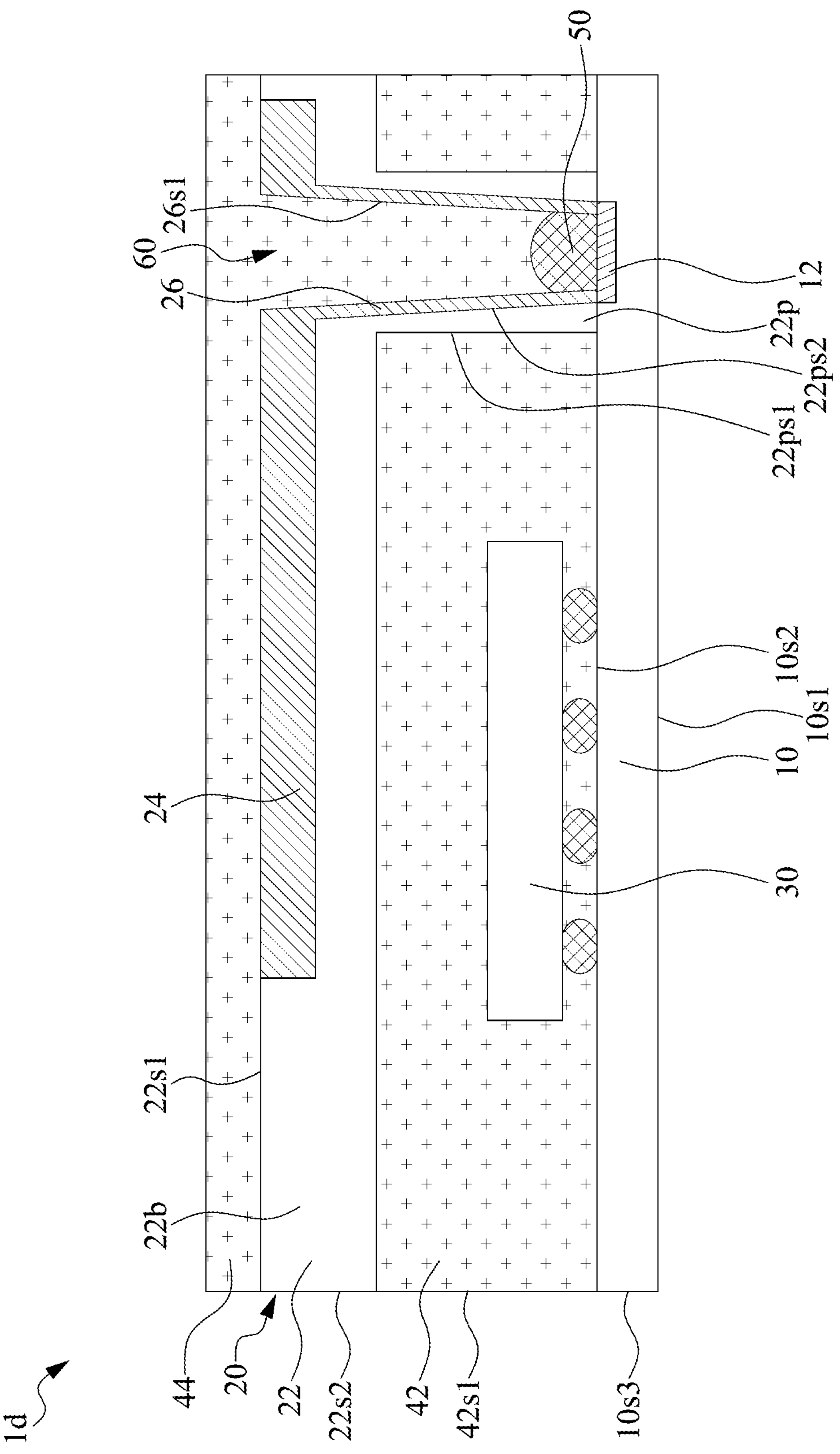
FIG. 4 illustrates a cross-sectional view of an electronic device in accordance with some arrangements of the present disclosure.

FIG. 4 illustrates a cross-sectional view of an electronic device 1*d* in accordance with some arrangements of the present disclosure. The electronic device 1*d* of FIG. 4 is similar to the electronic device 1*a* in FIG. 1C, differing as follows.

In some arrangements, the electronic device 1*d* may include an encapsulant 44. The material of the encapsulant 44 may be the same as or similar to the encapsulant 42. In some arrangements, the encapsulant 44 may be disposed on or over the surface 22*s*1 of the dielectric structure 22. In some arrangements, the encapsulant 44 may cover the antenna pattern 24. In some arrangements, the encapsulant 44 may cover and be in contact with the feeding portion 26. In some arrangements, the encapsulant 44 may be disposed within the opening 60. In some arrangements, the encapsulant 44 may cover the electrical connector 50. In some arrangements, the encapsulant 44 may be in contact with the electrical connector 50. In this arrangement, the antenna pattern 24 may be encapsulated by the encapsulant 44. The encapsulant 44 may help reduce the size of the antenna pattern 24.

Figure 5:
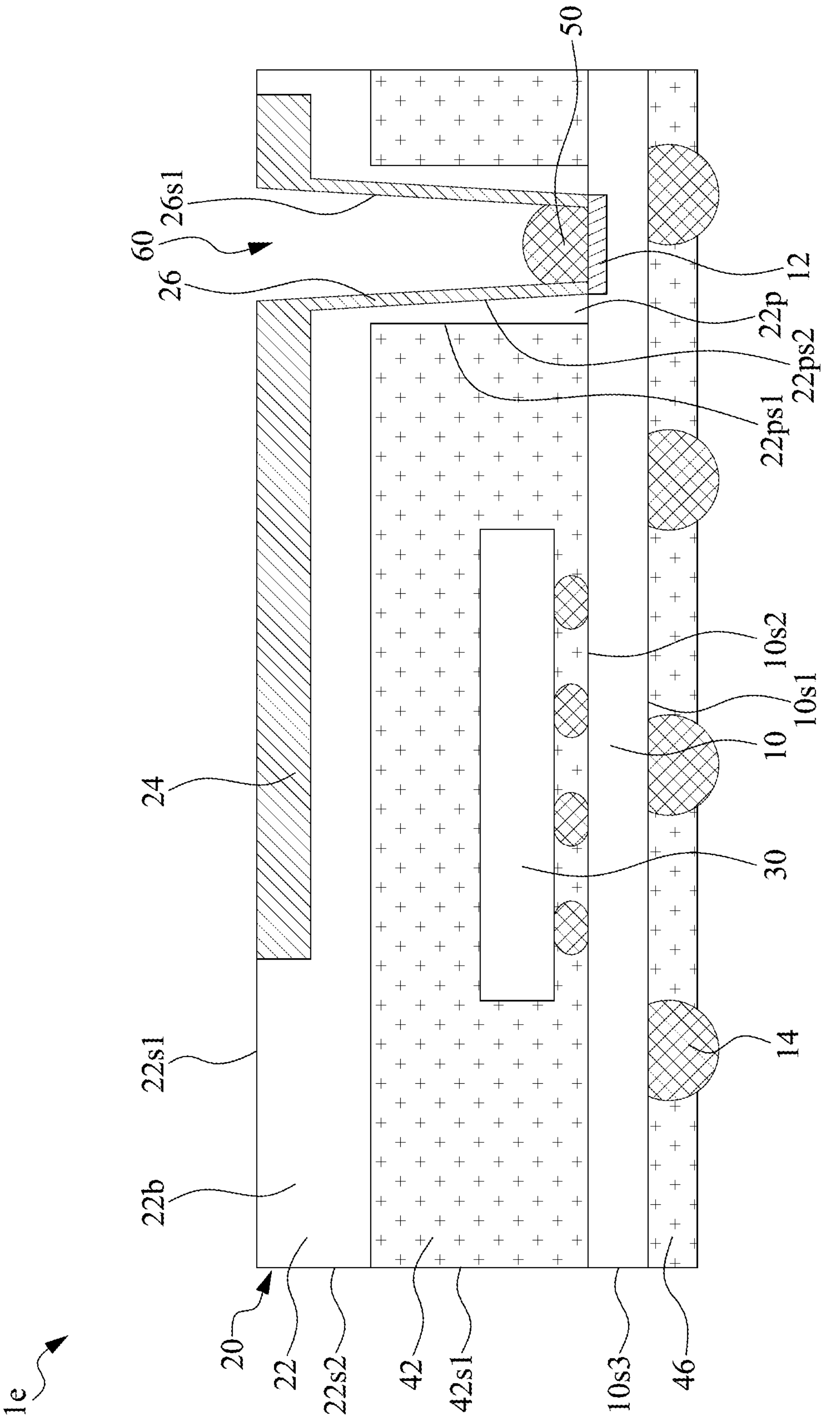
FIG. 5 illustrates a cross-sectional view of an electronic device in accordance with some arrangements of the present disclosure.

FIG. 5 illustrates a cross-sectional view of an electronic device 1*e* in accordance with some arrangements of the present disclosure. The electronic device 1*e* of FIG. 5 is similar to the electronic device 1*a* in FIG. 1C, differing as follows.

The electronic device 1*e* may include electrical connectors 14. The electrical connectors 14 may be disposed on or under the surface 10*s*1 of the carrier 10. The electrical connector 14 may include a solder material, such as tin (Sn), gallium (Ga), indium (In), bismuth (Bi), or other suitable materials.

In some arrangements, the electronic device 1*e* may include an encapsulant 46. In some arrangements, the encapsulant 46 may be disposed on or under the surface 10*s*1 of the carrier 10. The encapsulant 46 may encapsulate a portion (e.g., an upper portion) of the electrical connectors 14. The encapsulant 46 may be spaced apart from the encapsulant 42 by the carrier 10.

Figure 6A:
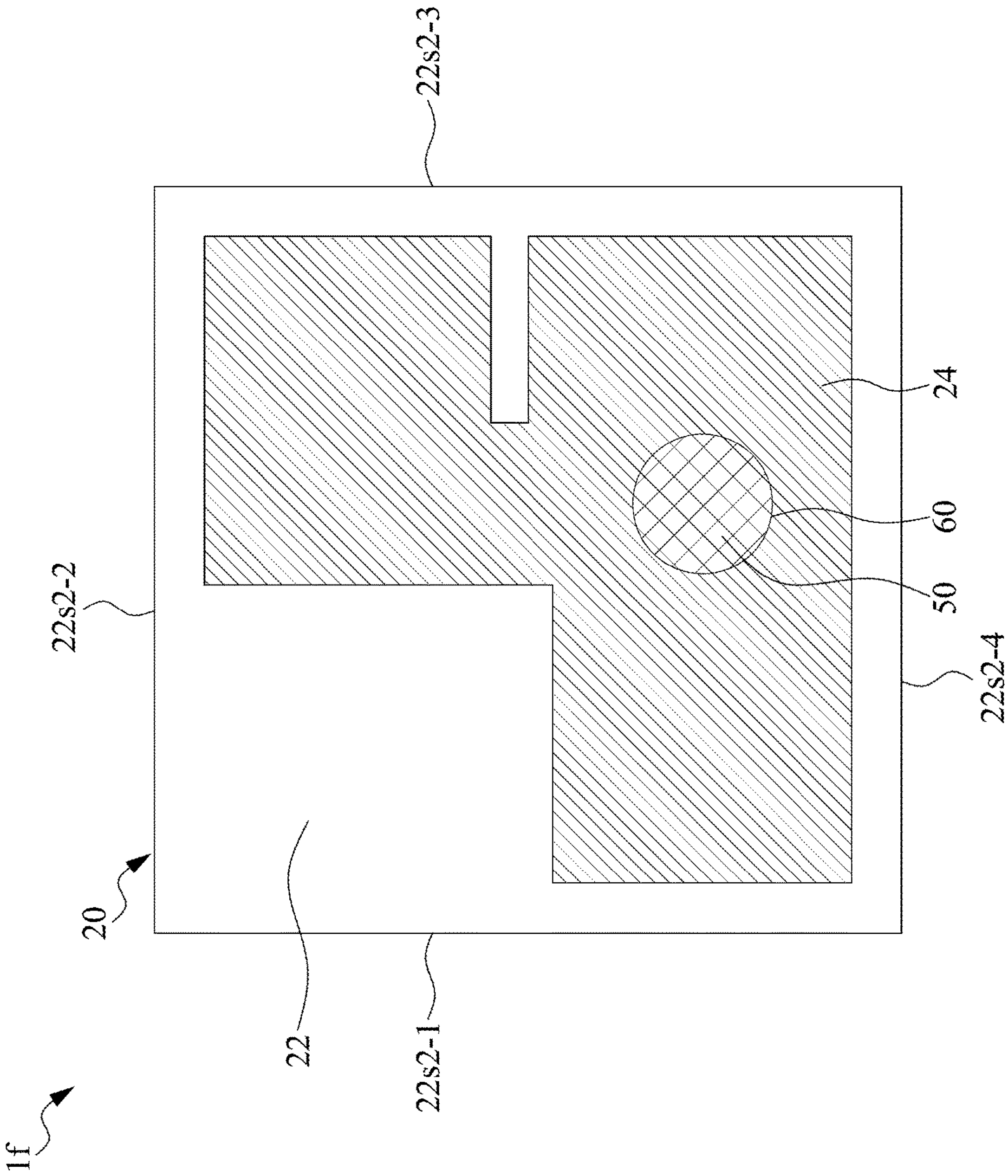
FIG. 6A, FIG. 6B, and FIG. 6C illustrate top views of electronic devices in accordance with some arrangements of the present disclosure.
Figure 6B:
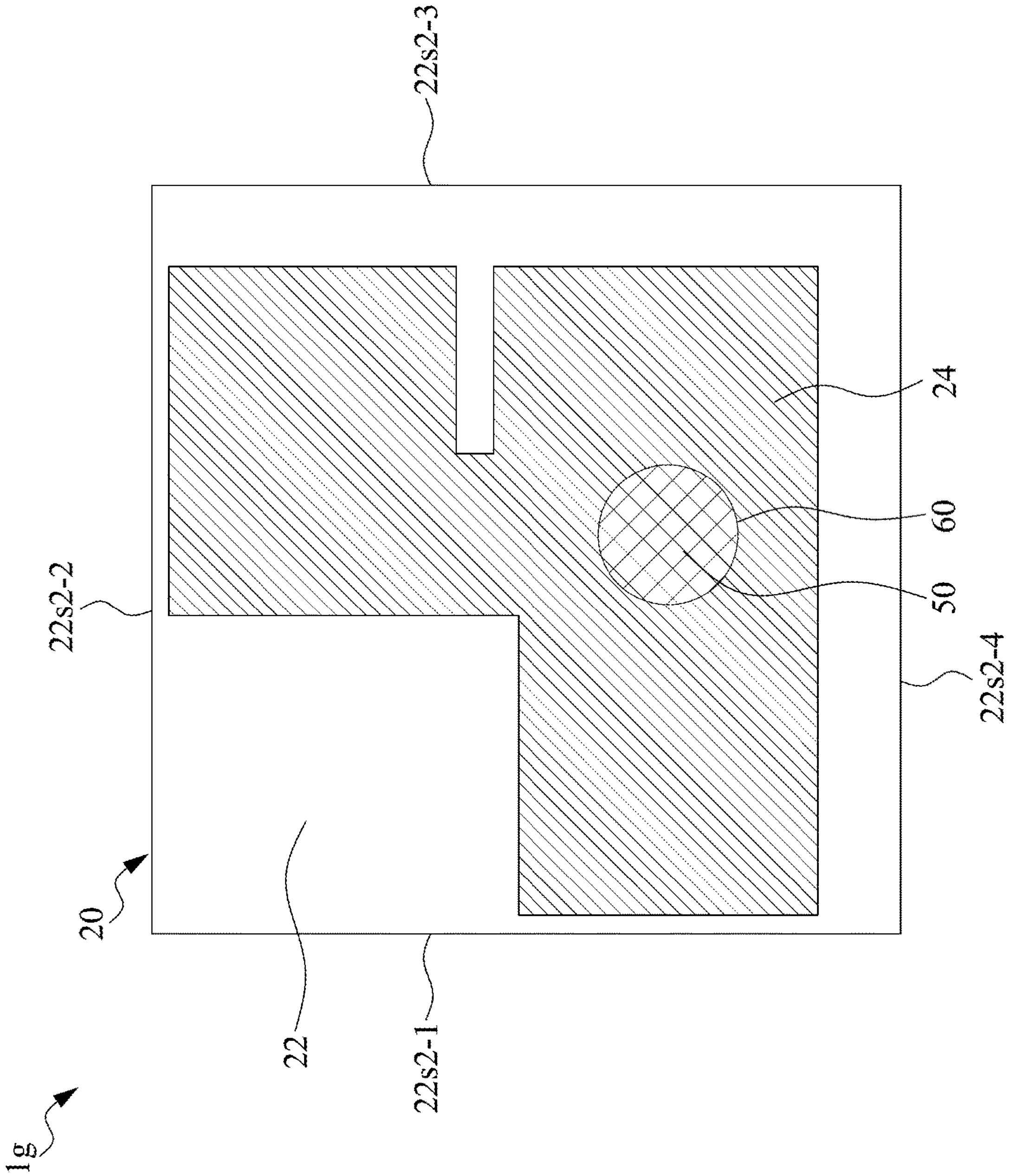
Figure 6C:
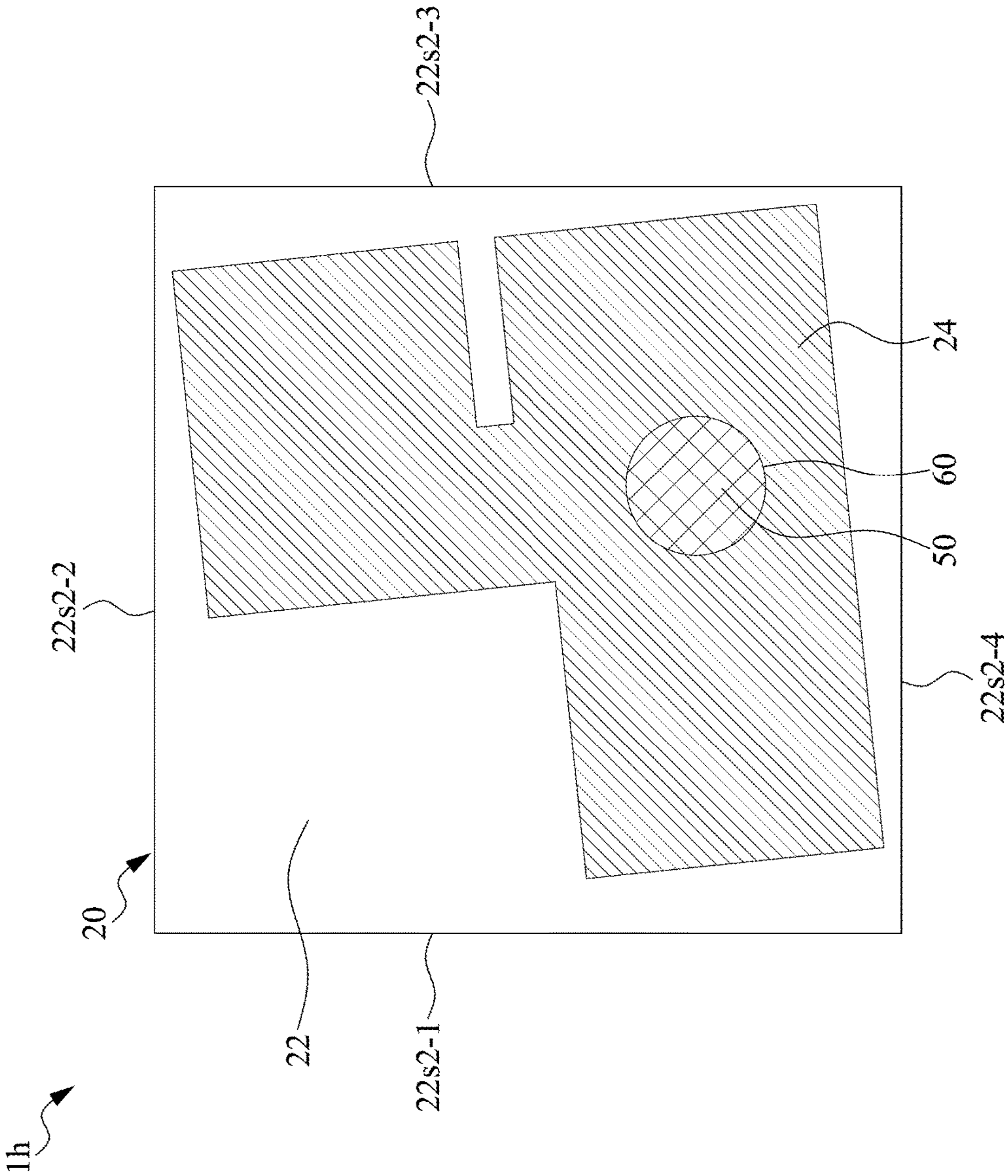

FIG. 6A, FIG. 6B, and FIG. 6C illustrate top views of electronic devices 1*f*, 1*g*, and 1*h* in accordance with some arrangements of the present disclosure.

The electronic device 1*f* illustrates the antenna pattern 24 with no substantial offsets (e.g., displacement and/or rotation offset). The dielectric structure 22 may have surfaces 22*s*2-1, 22*s*2-2, 22*s*2-3, and 22*s*2-4. In some arrangements, the profile of the antenna pattern 24 of the electronic device 1*f* may define an ideal distance between the edge of the antenna pattern 24 and surfaces 22*s*2-1, 22*s*2-2, 22*s*2-3, and 22*s*2-4. For example, the shortest distance between the antenna pattern 24 and the surface 22*s*2-1 may be substantially the same as that between the antenna pattern 24 and the surface 22*s*2-3, and the shortest distance between the antenna pattern 24 and the surface 22*s*2-2 may be substantially the same as that between the antenna pattern 24 and the surface 22*s*2-4. The edge of the antenna pattern 24 may be substantially parallel to the surfaces 22*s*2-1, 22*s*2-2, 22*s*2-3, and/or 22*s*2-4.

The electronic device 1*g* illustrates the antenna pattern 24 with a displacement offset. For example, the shortest distance between the antenna pattern 24 and the surface 22*s*2-1 may be different from that between the antenna pattern 24 and the surface 22*s*2-3. The shortest distance between the antenna pattern 24 and the surface 22*s*2-2 may be different from that between the antenna pattern 24 and the surface 22*s*2-4. Such displacement offset may result in a frequency offset of signals (e.g., RF signals) between the electronic devices 1*f* and 1*g*.

The electronic device 1*h* illustrates the antenna pattern 24 with a rotation offset. In some arrangements, the edge of the antenna pattern 24 may be slanted with respect to the surfaces 22*s*2-1, 22*s*2-2, 22*s*2-3, and/or 22*s*2-4. Such rotation offset may result in a frequency offset between the electronic devices 1*f* and 1*h*.

FIG. 7A, FIG. 7B, FIG. 7C, FIG. 7D, FIG. 7E, and FIG. 7F illustrate various stages of an example of a method for manufacturing an electronic device according to some arrangements of the present disclosure.

Figure 7A:
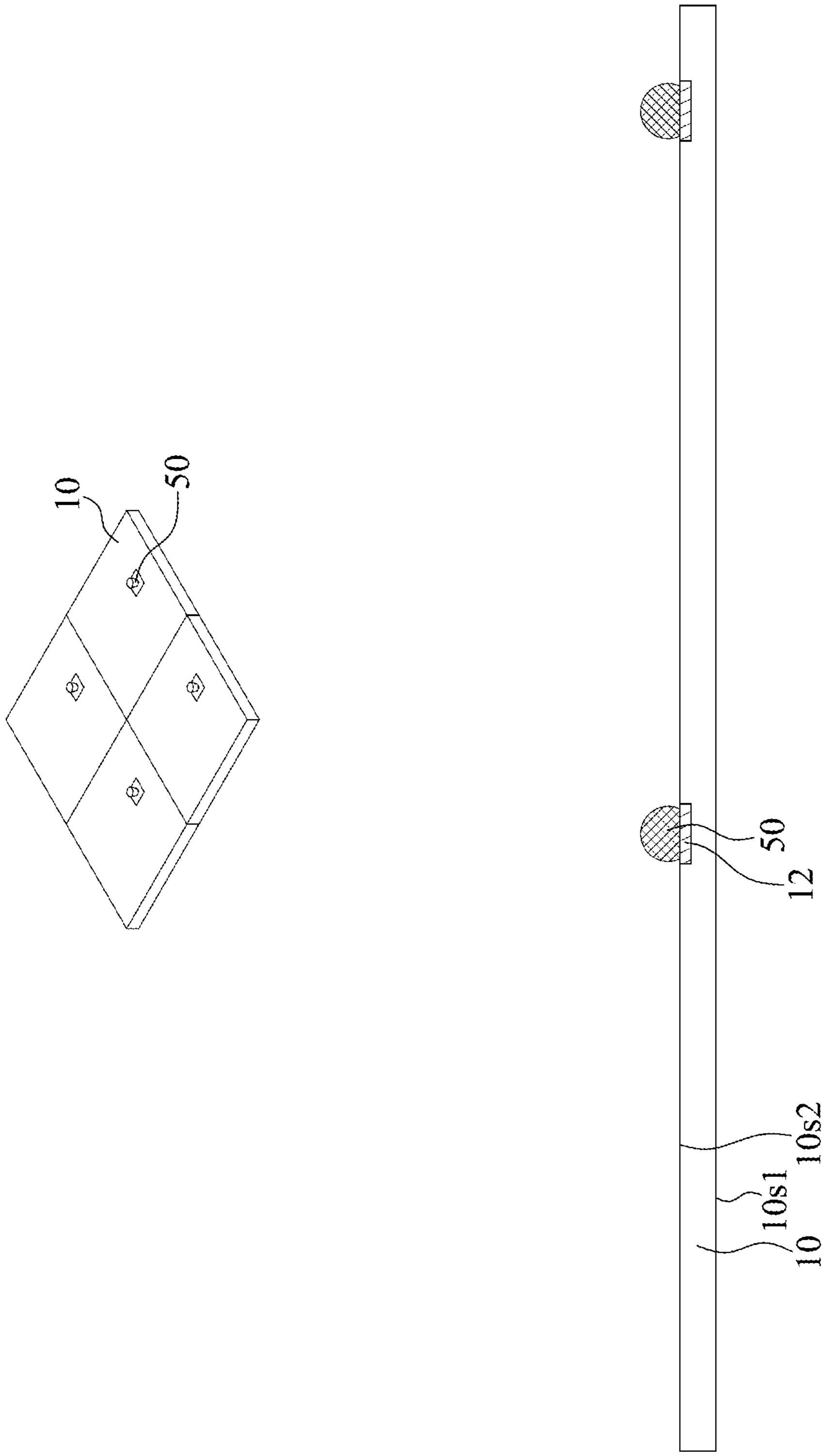
FIG. 7A, FIG. 7B, FIG. 7C, FIG. 7D, FIG. 7E, and FIG. 7F illustrate various stages of an example of a method for manufacturing an electronic device according to some embodiments of the present disclosure.

Referring to FIG. 7A, the carrier 10 may be provided. The carrier 10 may have the conductive pad 12 exposed by the surface 10*s*2. In some arrangements, the electrical connector 50 may be formed on or over the conductive pad 12. The electrical connector 50 may be formed by, for example, a printing technique, a coating technique, or other suitable techniques. In some arrangements, the carrier 10 may include a plurality of repeated units. Said repeated units may be separated after a singulation technique is performed.

Figure 7B:
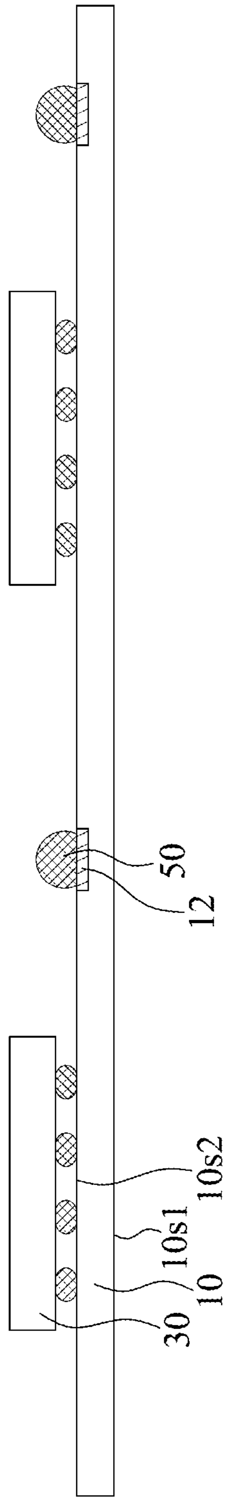

Referring to FIG. 7B, the electronic components 30 may be attached to the surface 10*s*2 of the carrier 10. In some arrangements, the electronic component 30 may be attached to the carrier 10 by a surface mount technique or other suitable techniques.

Figure 7C:
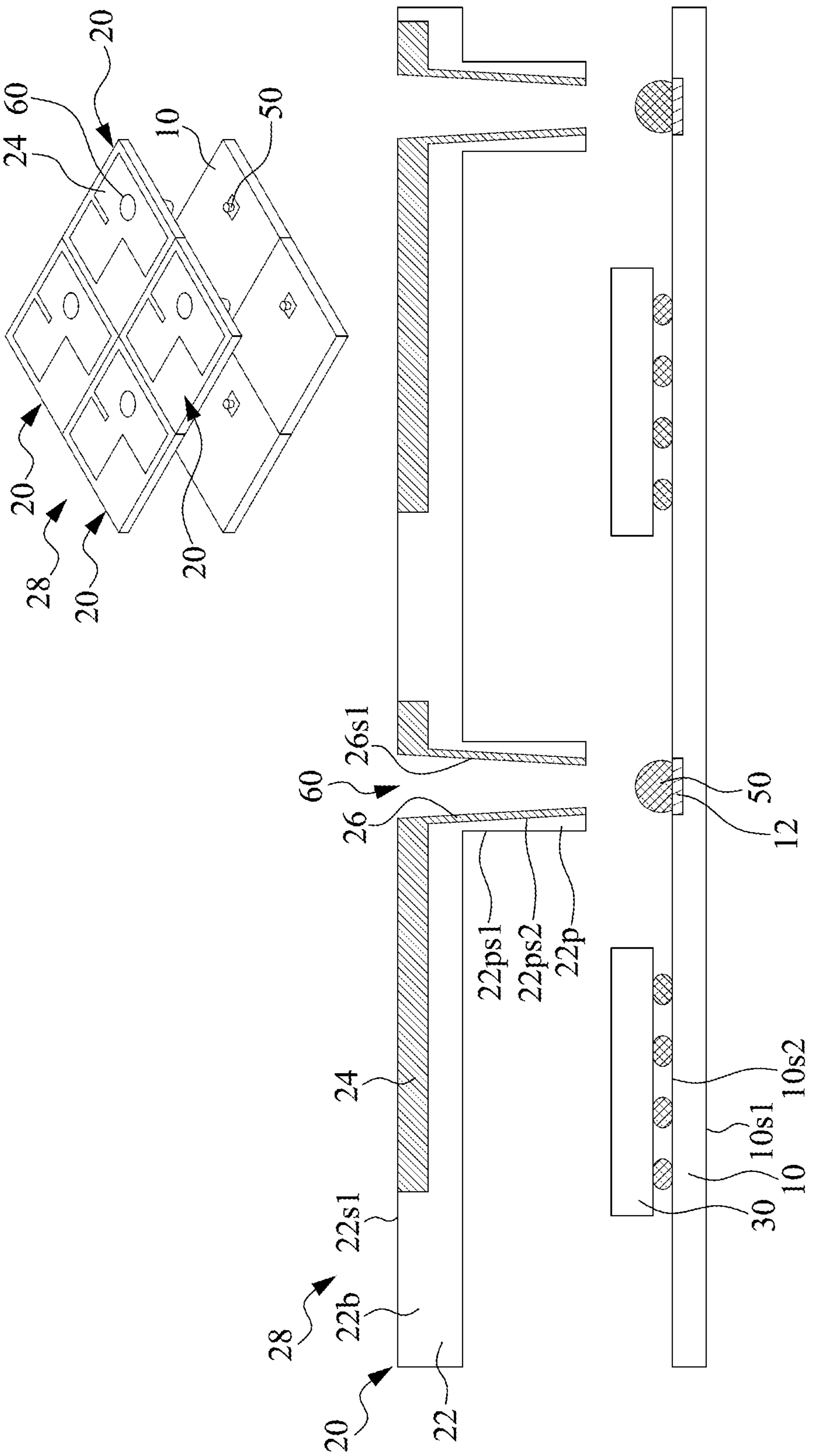

Referring to FIG. 7C, FIG. 7 illustrates a perspective view and a cross-sectional view. An antenna integrated structure 28 may be provided. In some arrangements, the antenna integrated structure 28 may include a plurality of antenna unit 20 which may define an N×N array. Each of the antenna units 20 may include an antenna pattern 24 and a feeding portion 26. These antenna patterns 24 and feeding portions 26 are integrated within one dielectric structure 22 which defines a monolithic structure. As a result, the displacement and rotation offset may be reduced after the antenna integrated structure 28 is mounted on the carrier 10. In this stage, an alignment technique may be performed to align the antenna integrated structure 28 and the carrier 10. It should be noted that some components (e.g., electronic component 30) are omitted from perspective view for brevity.

Figure 7D:
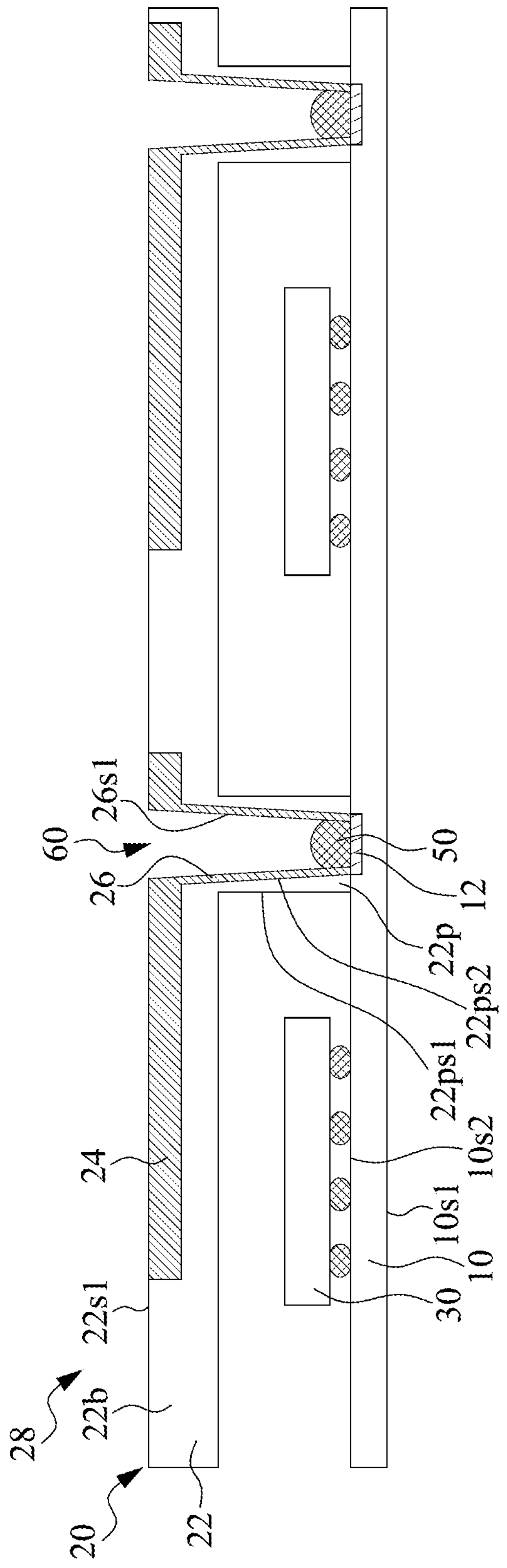

Referring to FIG. 7D, the antenna integrated structure 28 may be attached to the surface 10*s*2 of the carrier 10. Each of the antenna units 20 may be aligned with and then attached to a corresponding unit of the carrier 10. The opening 60 defined by the feeding portion 26 or dielectric structure 22 may be aligned with the electrical connector 50. Next, a welding operation may be performed to reflow or melt the electrical connector 50. In this stage, if the solder material climbs onto the surface 26*s*1, the electrical connector 52 as shown in FIG. 2A may be produced. In this stage, if there is an excessive amount of solder material, it may fill the opening 60 and consequently define the electrical connector 54 as shown in FIG. 3. In this stage, a portion of the electrical connector 50 may be disposed between the conductive pad 12 and the lower surface of the feeding portion 26.

Figure 7E:
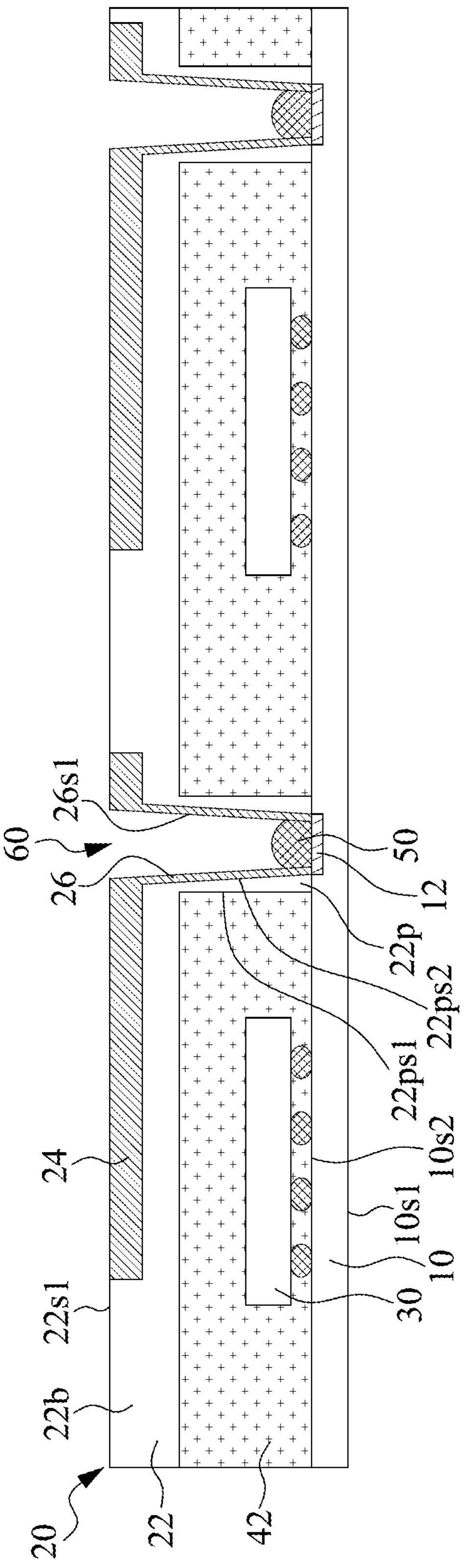

Referring to FIG. 7E, the encapsulant 42 may be formed between the carrier 10 and the dielectric structure 22. The electronic component 30 and the extension 22*p* of the dielectric structure 22 may be encapsulated. In some cases, if the dielectric structure 22 is over-molded, the encapsulant 44 as shown in FIG. 4 may be produced.

Figure 7F:
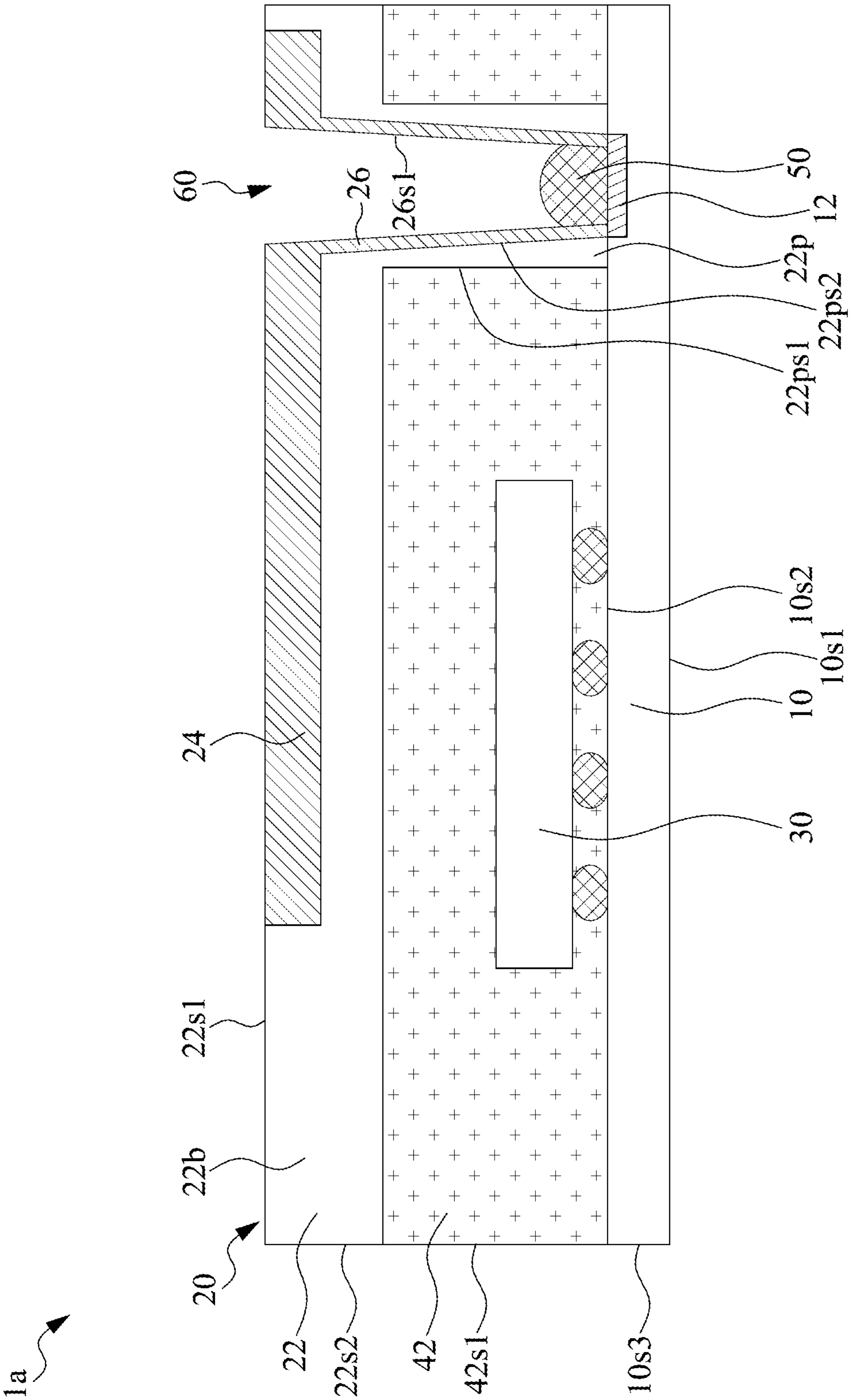

Referring to FIG. 7F, a singulation technique may be performed. The carrier 10, dielectric structure 22, and the encapsulant 42 may be cut. As a result, the lateral surfaces of the carrier 10, dielectric structure 22, and encapsulant 42 may be substantially aligned with each other. The repeated units of the carrier 10 and multiple antenna patterns 24 may be separated. As a result, an electronic device (e.g., the electronic device 1*a* as shown in FIG. 1A to FIG. 1C) may be produced.

In this arrangement, the profile and the location of the antenna pattern 24 and feeding portion 26 are predetermined and integrated within one dielectric structure 22. When the antenna integrated structure 28 is attached to the carrier 10, each of the feeding portions 26 may be aligned with a corresponding electrical connector 50 with less offset. In a comparative example, individual antenna units may be attached to a carrier using solder material, followed by a reflow technique to cure the solder. In this scenario, the antenna units may experience significant displacement and rotation offsets due to process issues.

Figure 8:
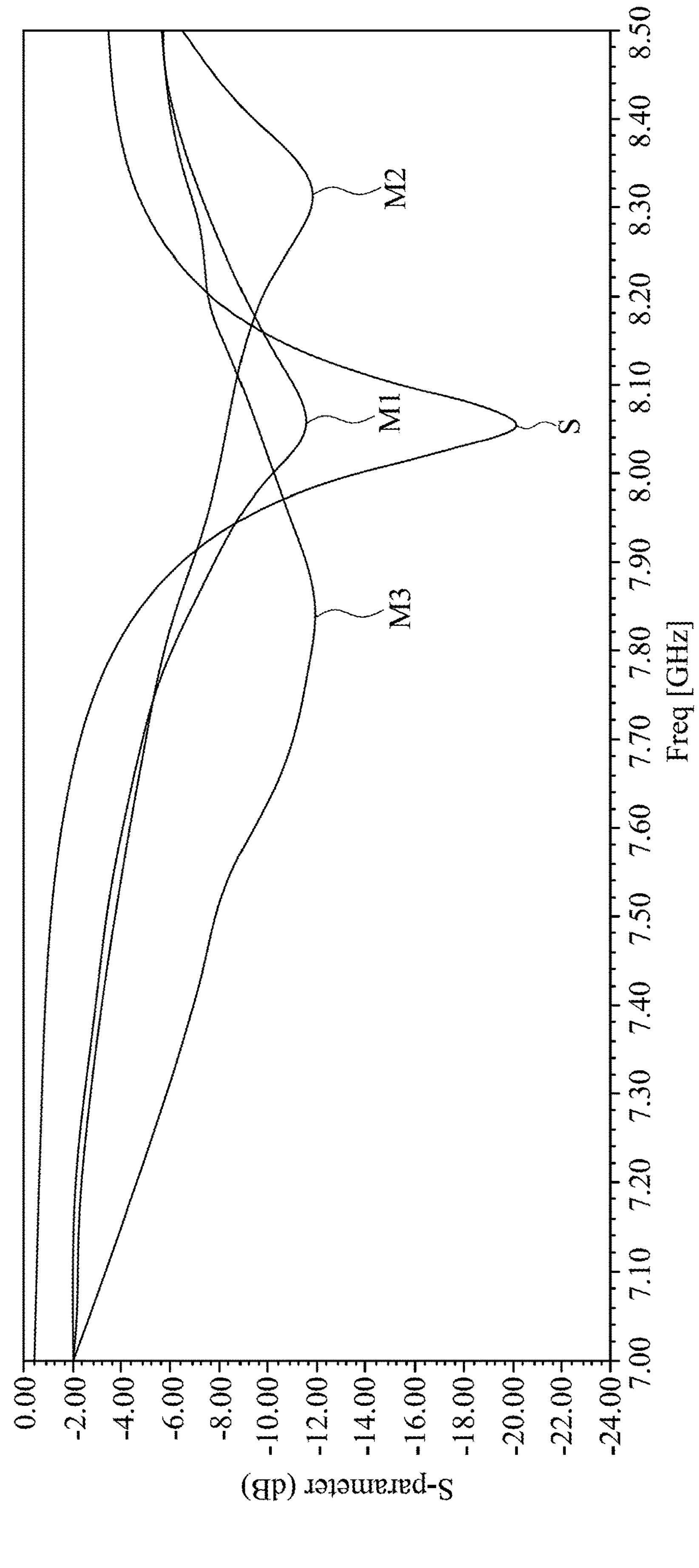
FIG. 8 illustrates simulated results of the S-parameter versus frequency of various electronic devices.

FIG. 8 illustrates simulated results of the S-parameter versus frequency of various electronic devices. The unit of X-axis is $10^9$ Hz (GHz). The unit of Y-axis is decibel (dB). The peak of the curve may be defined as an operation frequency of an electronic device. The "S" curve represents the S-parameter versus frequency of an ideal device in an ideal environment. The "M1" curve represents the S-parameter versus frequency of the electronic device(s) 1*a* to 1*d* in the present disclosure. The "M2" curve represents the S-parameter versus frequency of an electronic device with a rotation offset. The "M3" curve represents the S-parameter versus frequency of an electronic device with a displacement offset. As shown in FIG. 8, since the electronic devices in the present disclosure have fewer or no offsets (such as displacement or rotation offset), the operation frequencies of the electronic devices can be closer to the ideal case compared to the electronic devices with offsets (displacement or rotation offset). Additionally, in the embodiments of the present disclosure, the antenna patterns are substantially free of shift (displacement or rotation offset), reducing the offset of operation frequencies between electronic devices.

Figure 9A:
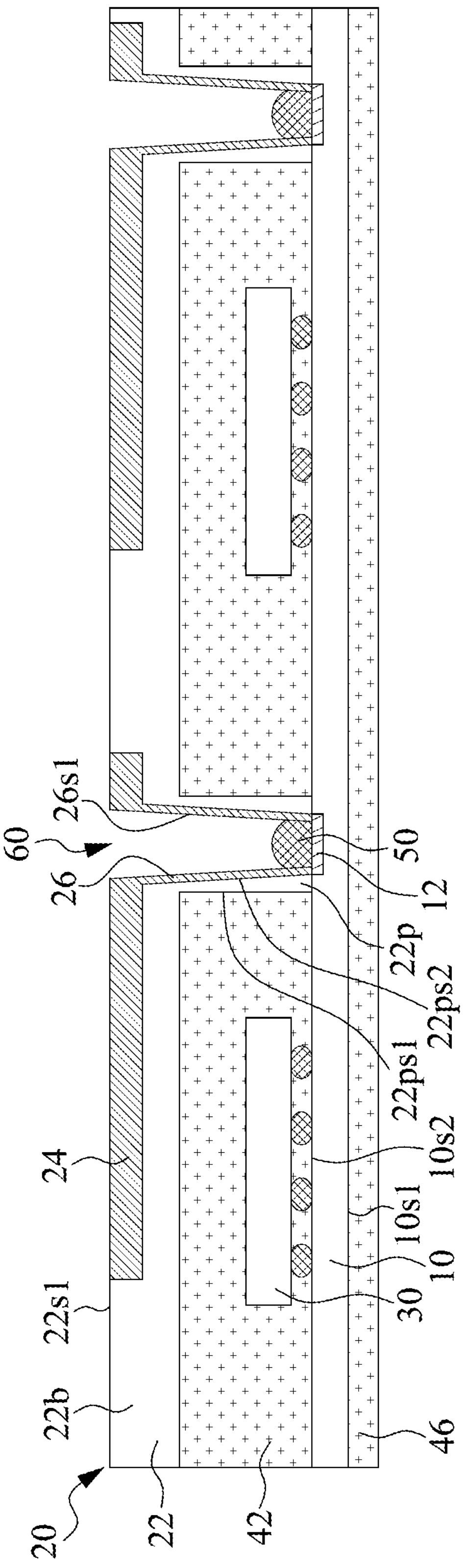
FIG. 9A, FIG. 9B, and FIG. 9C illustrate various stages of an example of a method for manufacturing an electronic device according to some embodiments of the present disclosure.
Figure 9B:
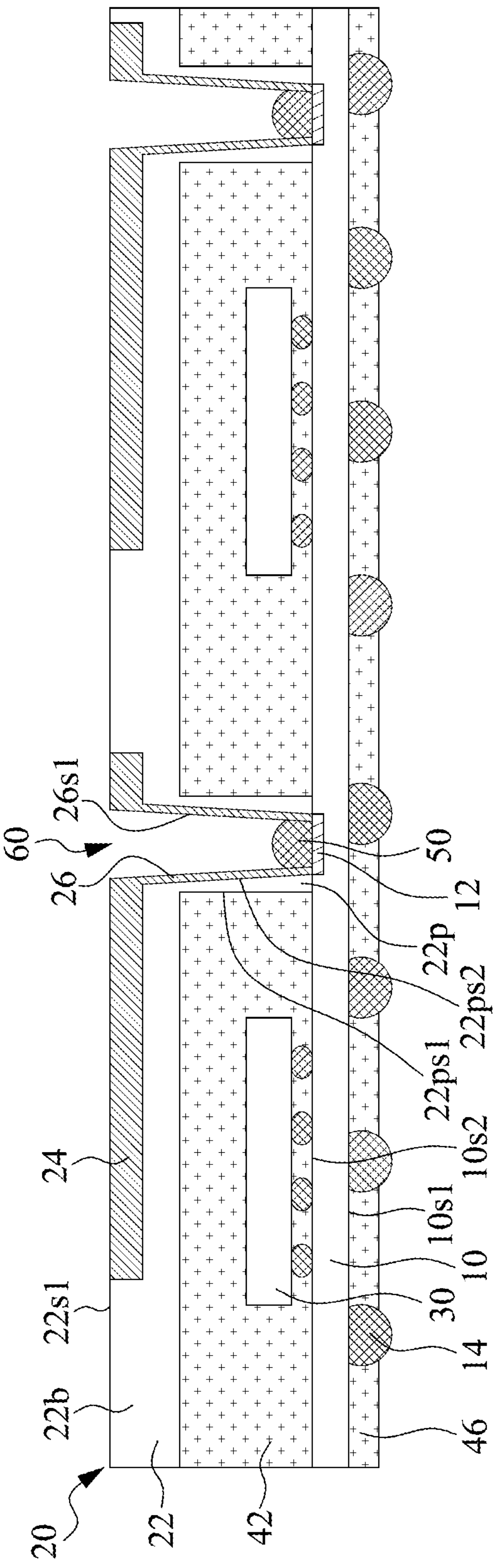
Figure 9C:
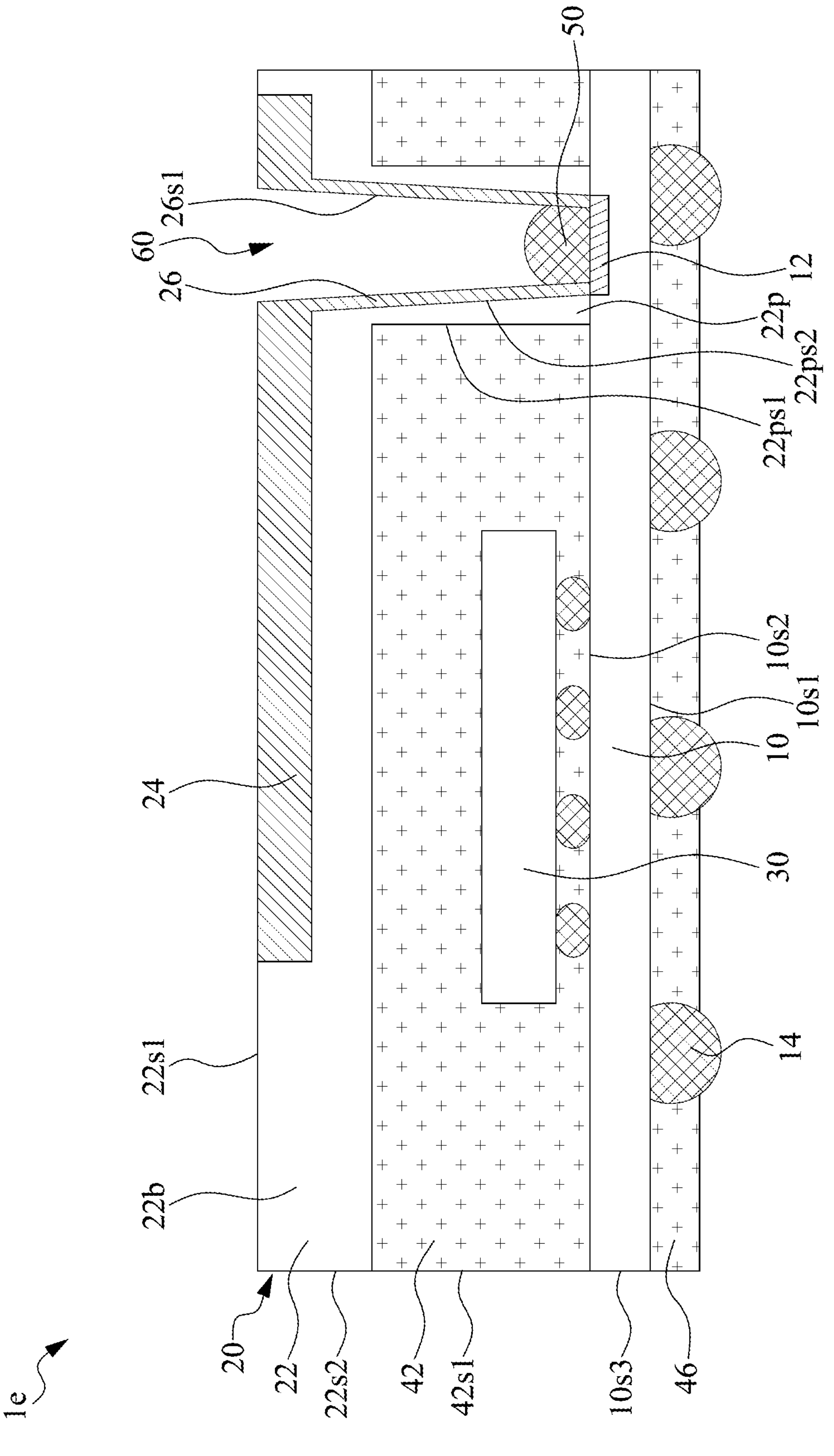

FIG. 9A, FIG. 9B, and FIG. 9C illustrate various stages of an example of a method for manufacturing an electronic device according to some embodiments of the present disclosure. The stage as shown in FIG. 7D may be followed by the stage as shown in FIG. 9A.

Referring to FIG. 9A, in some arrangements, the antenna unit 20 may be attached to a supporter (not shown) before forming the encapsulant 42. In some arrangements, the carrier 10 may be over-molded, and the encapsulant 46 may be formed to cover the surface 10*s*1 of the carrier 10.

Referring to FIG. 9B, the electrical connectors 14 may be formed on or under the surface 10*s*1 of the carrier 10. In some arrangements, a portion of the encapsulant 46 may be removed, for example, by a laser ablation technique or other suitable techniques. Next, the electrical connectors 14 may be formed within the openings defined by the encapsulant 46. In some arrangements, the electrical connectors 14 may be formed, and the encapsulant 46 may be formed to encapsulate the electrical connectors 14. In some arrangements, the encapsulant 46 may be exposed by using an exposed mold chase. In some arrangements, the encapsulant 46 may be over-molded and then removed by a grinding technique or laser ablation technique to expose the encapsulant 46.

Referring to FIG. 9C, a singulation technique may be performed. The carrier 10, dielectric structure 22, the encapsulant 42 and the encapsulant 46 may be cut. The repeated units of the carrier 10 and multiple antenna patterns 24 may be separated. As a result, an electronic device (e.g., the electronic device 1*e* as shown in FIG. 5) may be produced.

FIG. 10A, FIG. 10B, FIG. 10C, FIG. 10D, FIG. 10E, and FIG. 10F illustrate various stages of an example of a method for manufacturing an electronic device according to some embodiments of the present disclosure.

Figure 10A:
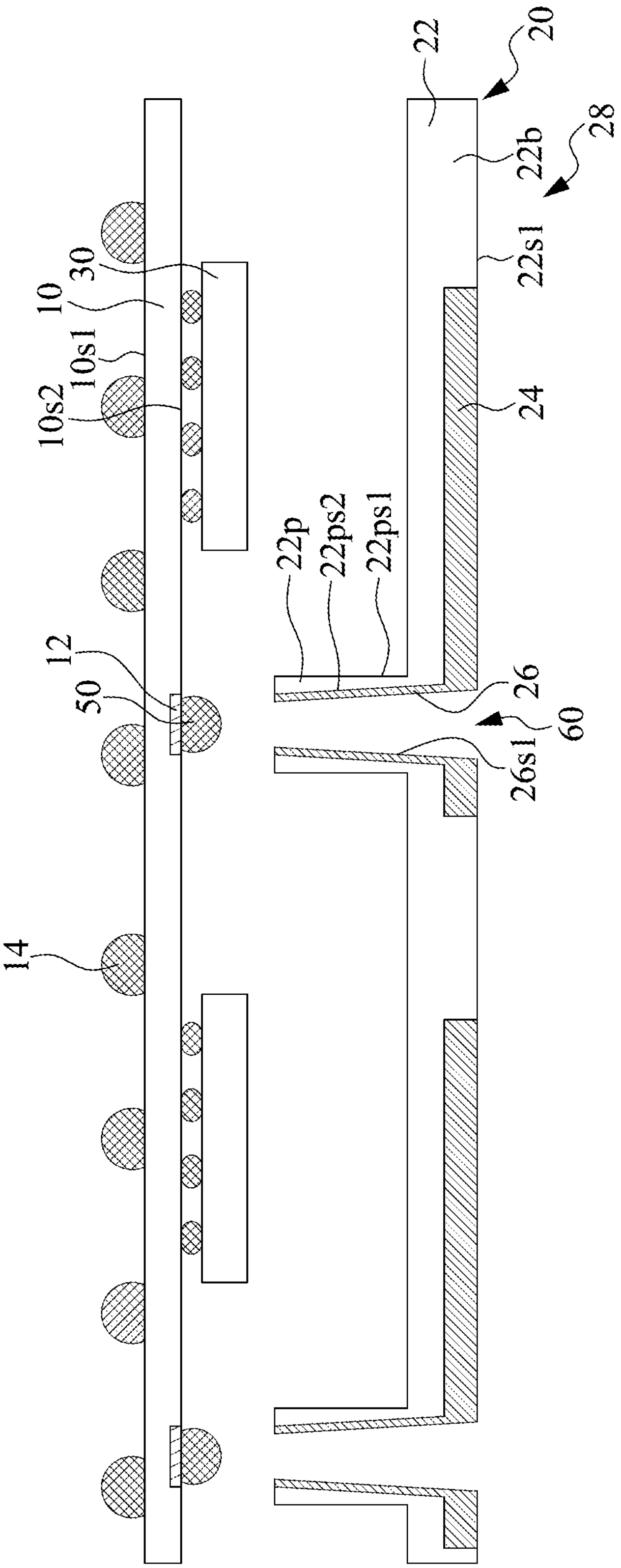
FIG. 10A, FIG. 10B, FIG. 10C, FIG. 10D, FIG. 10E, and FIG. 10F illustrate various stages of an example of a method for manufacturing an electronic device according to some embodiments of the present disclosure.

Referring to FIG. 10A, the antenna integrated structure 28 may be provided and function as a supporter. The carrier 10 may be provided. The electrical connectors 14 may be formed on the surface 10*s*1.

Figure 10B:
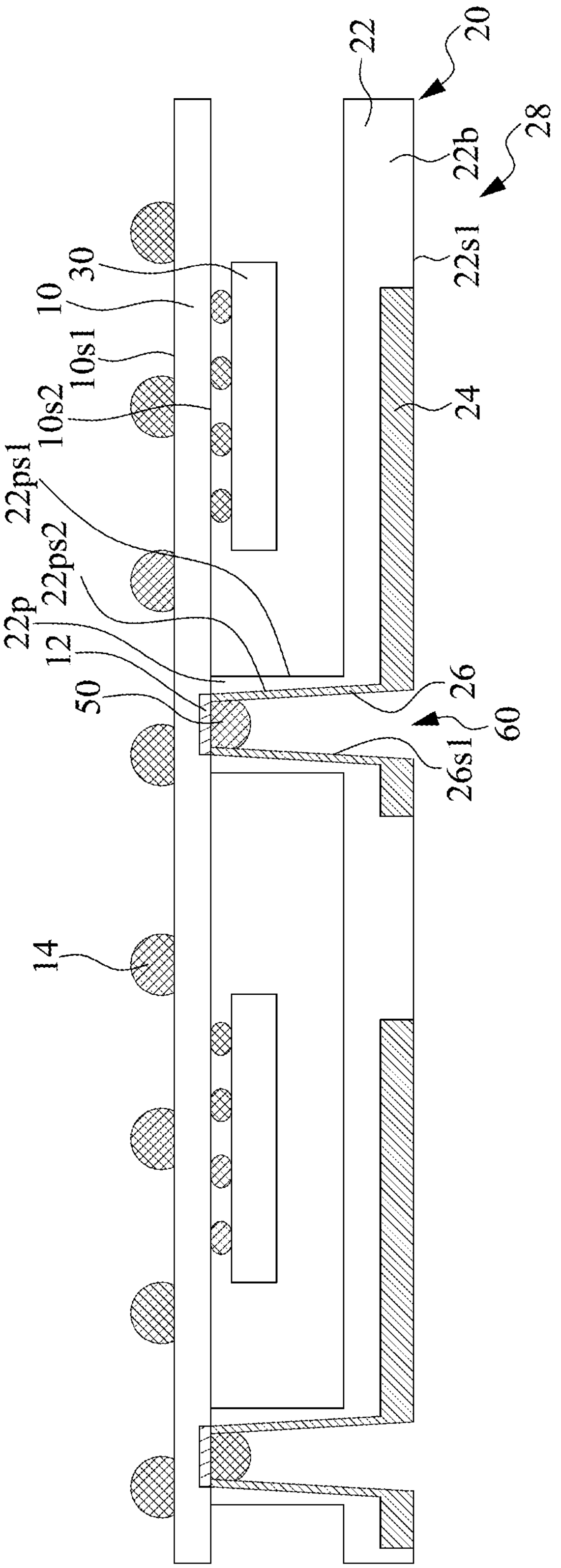

Referring to FIG. 10B, the antenna integrated structure 28 may be attached to the carrier 10.

Figure 10C:
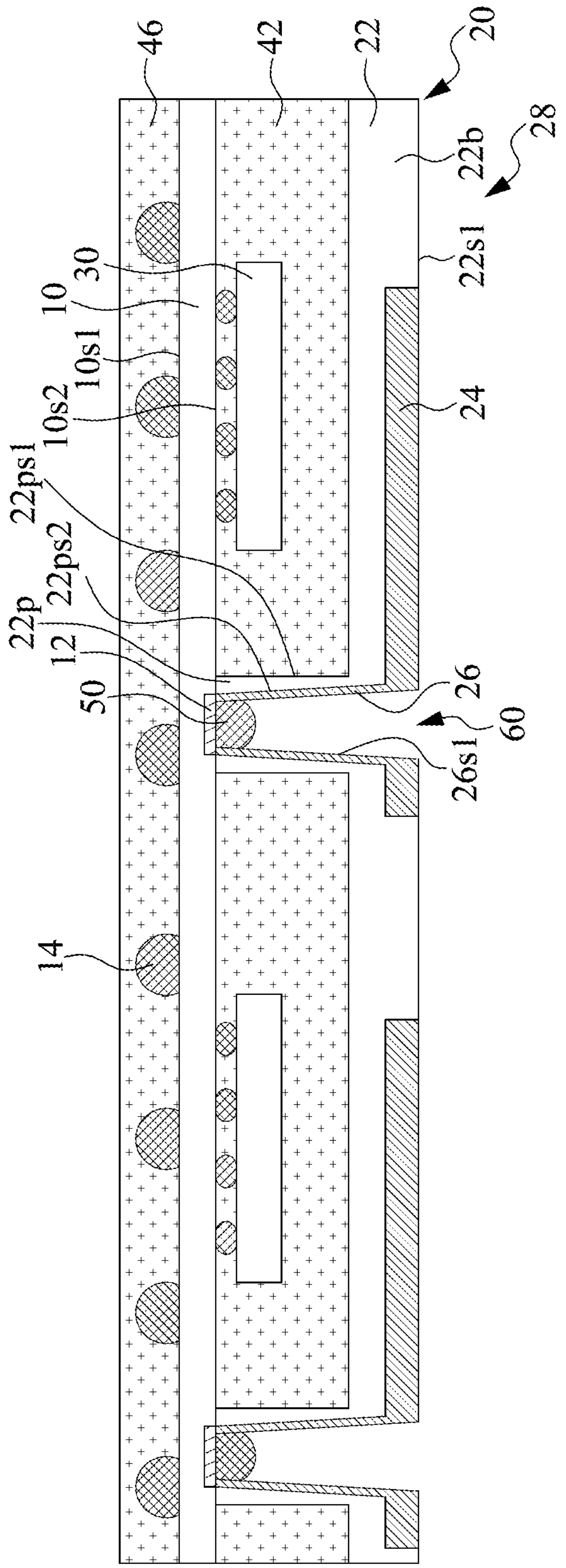

Referring to FIG. 10C, the encapsulant 42 and encapsulant 46 may be formed. In some arrangements, the encapsulant 42 and encapsulant 46 may be formed by one step.

Figure 10D:
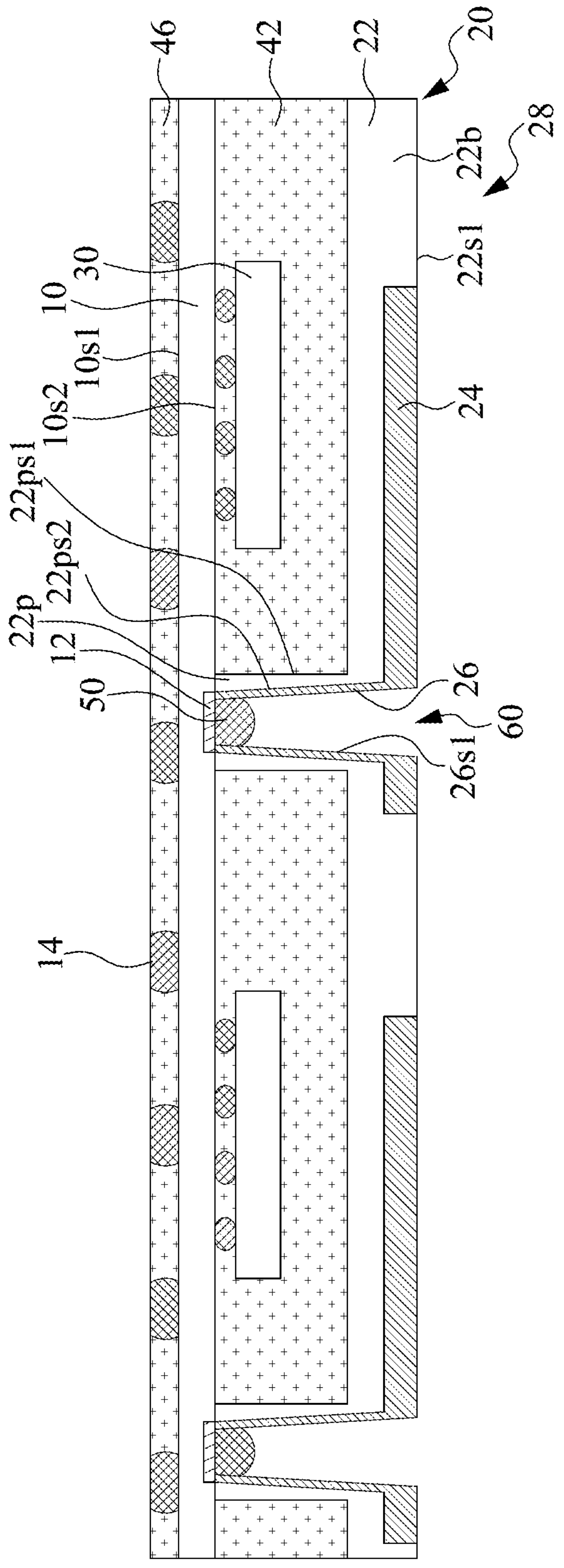

Referring to FIG. 10D, a grinding or polishing technique may be performed on the encapsulant 46. As a result, the top of the encapsulant 46 and the top of the electrical connector 14 may be substantially aligned.

Figure 10E:
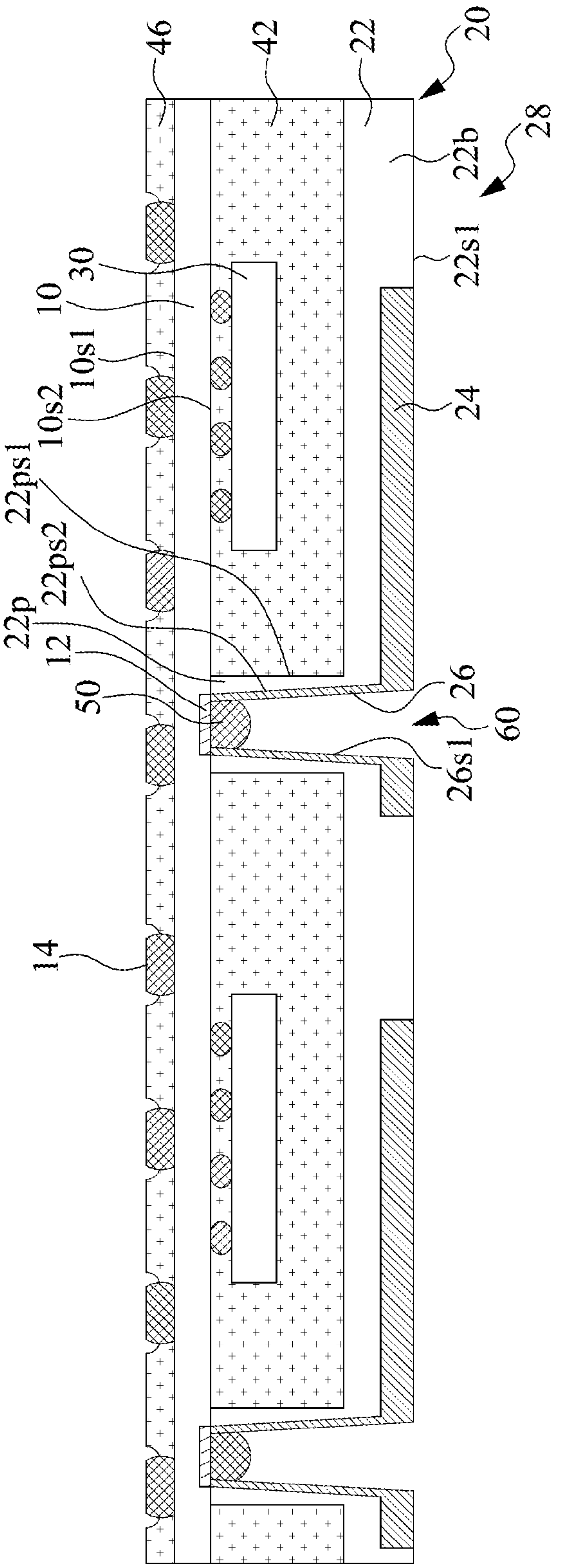

Referring to FIG. 10E, a portion of the encapsulant 46 may be removed, for example, by a laser ablation technique or other suitable techniques. As a result, the top of the encapsulant 46 may be disconnected to the top of the electrical connector 14.

Figure 10F:
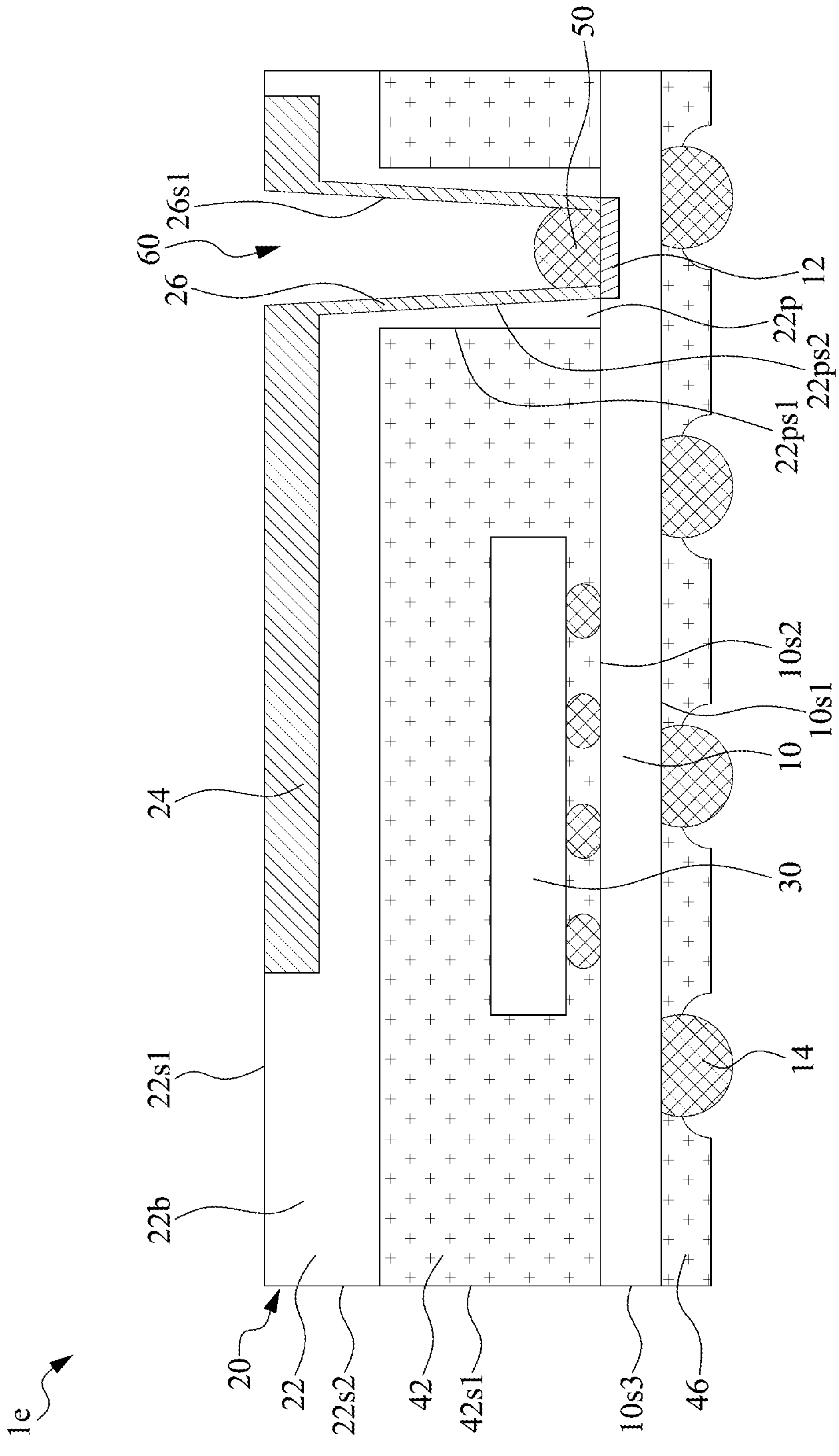

Referring to FIG. 10F, a reflow technique may be performed. In this stage, reflow materials may be utilized to reshape the electrical connectors 14. Next, a singulation technique may be performed. The carrier 10, dielectric structure 22, the encapsulant 42 and the encapsulant 46 may be cut. The repeated units of the carrier 10 and multiple antenna patterns 24 may be separated. As a result, an electronic device may be produced.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific arrangements thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other arrangements of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:

an antenna unit comprising a base portion and an extension portion protruding downwardly from the base portion;

a carrier supporting the extension portion and configured to reduce a frequency offset of signals from the antenna unit;

a feeding element supported by the extension portion and electrically connected to the carrier, wherein the feeding element defines an opening accommodating an electrical connector, and the electrical connector electrically connects the feeding element to the carrier; and an encapsulant encapsulating the extension portion and the carrier, wherein a portion of the encapsulant is disposed within the opening.

2. The electronic device of claim 1, further comprising:

an antenna pattern supported by the base portion and electrically connected to the feeding element.

3. The electronic device of claim 2, wherein the antenna pattern is partially disposed within the base portion.

4. The electronic device of claim 1, wherein a portion of the electrical connector extends to a sidewall which defines the opening of the feeding element.

5. An electronic device, comprising:

a carrier;

an antenna unit disposed over the carrier, wherein the antenna unit comprises a conductive structure defining an opening extending toward the carrier; and a conductive element disposed within the opening and configured to transceive a radio frequency (RF) signal between the carrier and the conductive structure, wherein the conductive structure has an inner sidewall exposed by the opening, the conductive element contacts the inner sidewall and exposes a portion of the inner sidewall, and the conductive element extends along the inner sidewall and forms a recess.

6. The electronic device of claim 5, wherein the conductive element has a first portion and a second portion which extend upwardly and spaced apart from each other by the recess.

7. The electronic device of claim 6, wherein the first portion and the second portion extend into different elevations with respect to the carrier.

8. The electronic device of claim 5, wherein the inner sidewall tapered toward the carrier.

9. The electronic device of claim 5, wherein the antenna unit comprises an antenna pattern, and the conductive structure is recessed from the antenna pattern.

10. The electronic device of claim 5, further comprising:

an encapsulant disposed between the carrier and the antenna unit, wherein the antenna unit comprises a dielectric structure disposed between the encapsulant and the conductive structure.

11. The electronic device of claim 10, wherein the dielectric structure penetrates the encapsulant.

* * * * *